United States Patent
Arney et al.

(10) Patent No.: US 8,094,517 B2
(45) Date of Patent: *Jan. 10, 2012

(54) FLASHER SONAR DEVICE WITH LCD ANNOTATIONS

(75) Inventors: Christopher E. Arney, Cumming, GA (US); Christopher James Bennett, Eufaula, AL (US); Scott Allen Harrington, Atlanta, GA (US)

(73) Assignee: Johnson Outdoors Inc., Racine, WI (US)

( * ) Notice: Subject to any disclaimer, the term of this patent is extended or adjusted under 35 U.S.C. 154(b) by 380 days.

This patent is subject to a terminal disclaimer.

(21) Appl. No.: 12/291,283

(22) Filed: Nov. 7, 2008

(65) Prior Publication Data

US 2009/0141589 A1    Jun. 4, 2009

Related U.S. Application Data

(60) Provisional application No. 61/004,832, filed on Nov. 30, 2007.

(51) Int. Cl.
*G01S 15/96* (2006.01)

(52) U.S. Cl. .......................................... 367/109
(58) Field of Classification Search ............... 367/109; 345/110
See application file for complete search history.

(56) References Cited

U.S. PATENT DOCUMENTS

| | | | |
|---|---|---|---|
| 2,071,284 A * | 2/1937 | Hyland | 116/244 |
| 3,713,143 A * | 1/1973 | Blitz | 367/109 |
| 3,964,012 A | 6/1976 | Yamamoto et al. | |
| 4,644,512 A | 2/1987 | Grilk | |
| 4,829,492 A | 5/1989 | Choi et al. | |
| 4,829,493 A | 5/1989 | Bailey | |
| 4,873,676 A | 10/1989 | Bailey et al. | |
| 5,184,330 A | 2/1993 | Adams et al. | |
| 5,459,479 A | 10/1995 | Cummings | |
| 5,594,707 A | 1/1997 | Goto et al. | |
| 5,973,997 A | 10/1999 | Yamamoto et al. | |
| 5,999,490 A | 12/1999 | Shimauchi et al. | |
| 6,009,044 A | 12/1999 | Goto et al. | |
| 6,628,569 B1 * | 9/2003 | Steiner et al. | 367/111 |
| 6,650,595 B2 | 11/2003 | Asakura | |
| 6,768,701 B1 * | 7/2004 | Cummings et al. | 367/109 |
| 7,057,972 B1 | 6/2006 | Noda et al. | |
| 7,495,997 B1 | 2/2009 | Cummings | |
| 2006/0158422 A1 * | 7/2006 | Ryu | 345/110 |
| 2009/0141588 A1 * | 6/2009 | Betts et al. | 367/109 |
| 2009/0141589 A1 * | 6/2009 | Arney et al. | 367/109 |
| 2009/0141590 A1 * | 6/2009 | Betts et al. | 367/111 |

OTHER PUBLICATIONS

RAYMARINE, Apelco FLX 400 Digital Color Flasher, Instruction Manual, May 9, 2003, pp. 1 and 7.

Humminbird Legend ID 40 Flasher, Internet Image, http://www.jbeezwatercraft.com/store/images/legendid40.jpg, visited Feb. 8, 2008.

(Continued)

*Primary Examiner* — Daniel Pihulic
(74) *Attorney, Agent, or Firm* — Reinhart Boerner Van Deuren P.C.

(57) ABSTRACT

A flasher sonar device includes a motor driven flasher that produces light output pulses at angular positions along a flasher ring lens based upon sonar returns. A liquid crystal display (LCD) positioned concentrically with the flasher ring lens displays a dynamic annotated range scale associated with the flasher ring lens. A controller coordinates operation of the motor driven flasher and the LCD.

20 Claims, 30 Drawing Sheets

OTHER PUBLICATIONS

Lowrance LCF 1440, Internet Image, http://images.outdoorinteractive.net/mgen/460138_d.jpg, visited Oct. 7, 2008.

Lowrance m68, Internet Image, http://i19.ebayimg.com/05/i/000/d7/dd/24c2_1.JPG, visited Feb. 8, 2008.

* cited by examiner

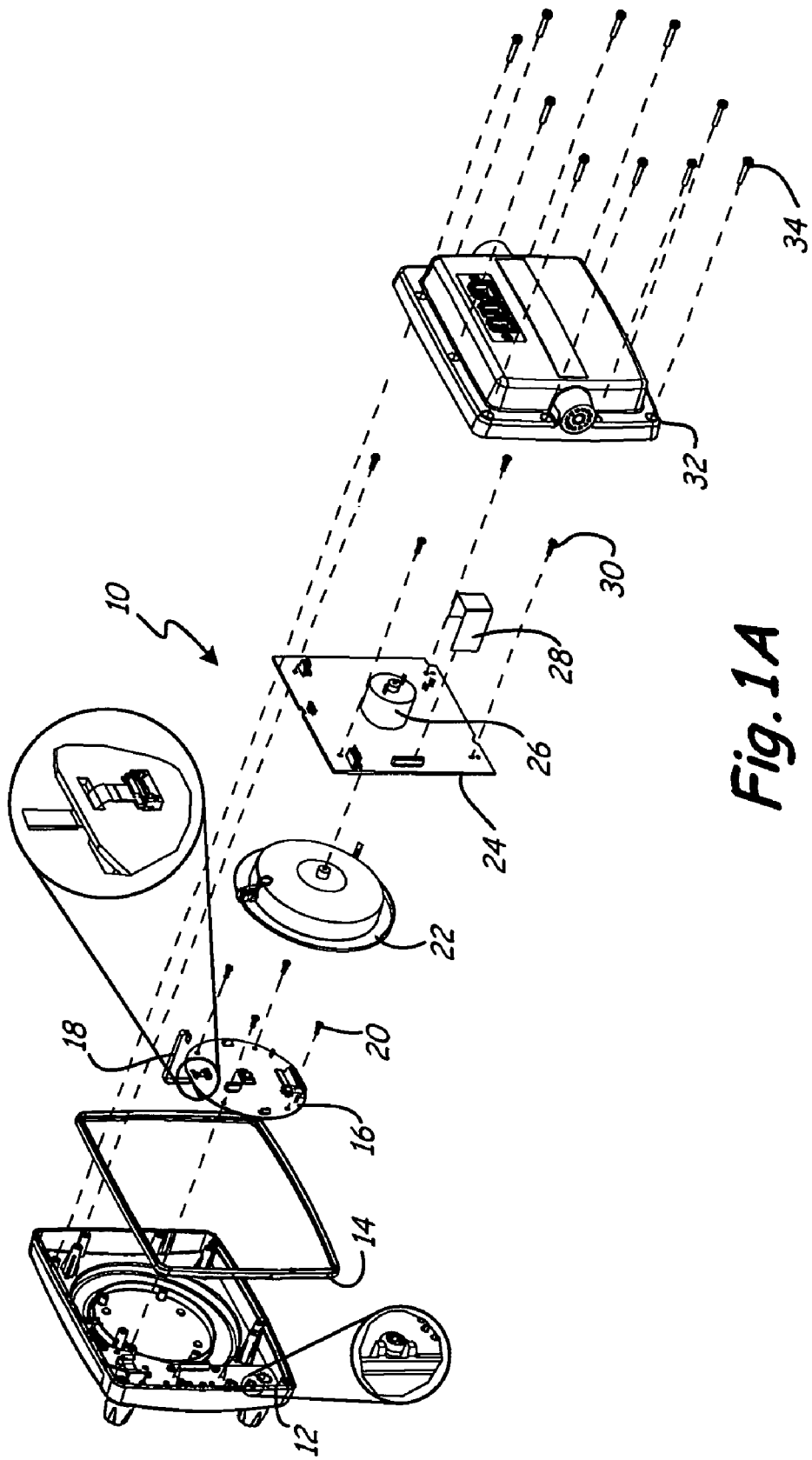

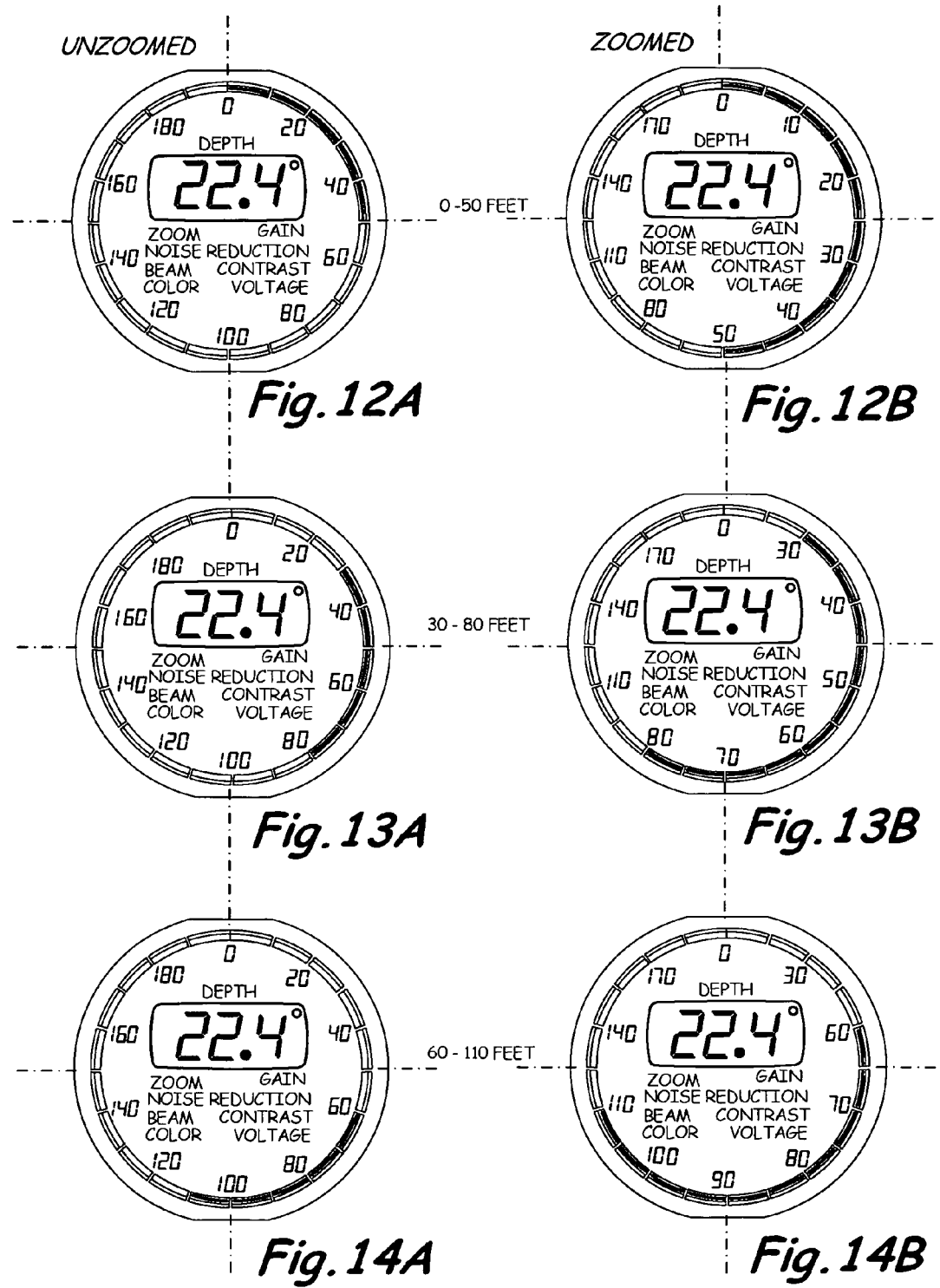

90 - 140 FEET

120 - 170 FEET

150 - 200 FEET

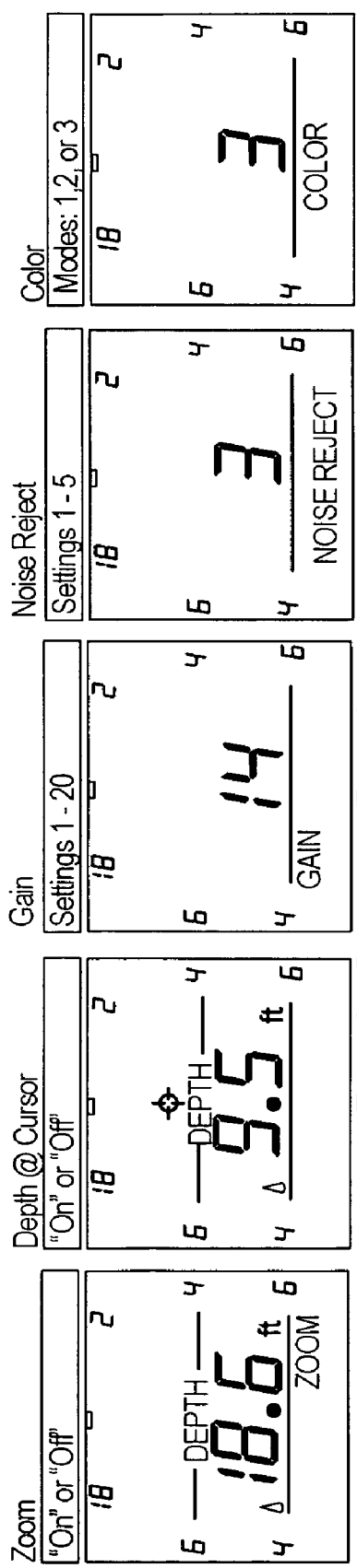
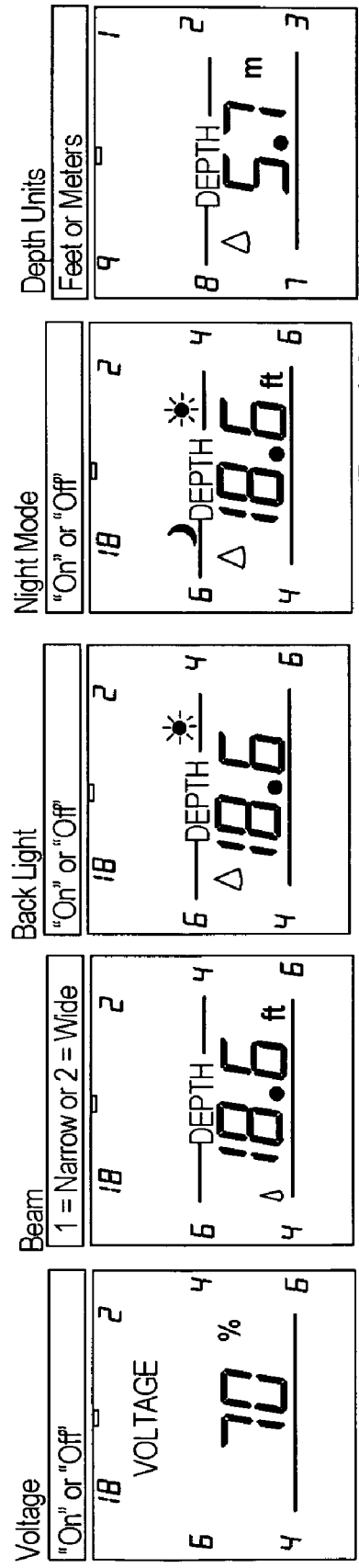

FLASHER SONAR DEVICE WITH LCD ANNOTATIONS

CROSS REFERENCE TO RELATED APPLICATION(S)

This application claims the benefit of Provisional Application No. 61/004,832 filed Nov. 30, 2007 for "Flasher Fish Finder" by C. Arney, C. Bennett, D. Betts, S. Harrington, and D. Malphurs. This application is also related to granted, commonly assigned U.S. patent entitled "Flasher Sonar Device with Light Guide" having U.S. Pat. No. 7,948,828, filed on even date herewith. This application is also related to co-pending, commonly assigned U.S. patent application entitled "Flasher Sonar Device with Interleaved Zoom" having Ser. No. 12/291,289, filed on even date herewith.

INCORPORATION BY REFERENCE

The aforementioned Provisional Application No. 61/004,832 is hereby incorporated by reference in its entirety.

BACKGROUND

The present invention relates to sonar devices, and in particular, to a flasher type sonar device.

Sonar systems are widely used by anglers in determining the depth of water in a lake or river, as well as the presence and depth of fish. Sonar systems use a transducer to generate a sonar pulse that is directed down through the water. The transducer receives a sonar echo return from the bottom, as well as sonar returns from fish or other objects in the water column located within the sonar beam. The time between the transmission of the sonar pulse and the reception of the sonar return can be used as a measure of the distance from the transducer to the bottom, or the distance of the transducer to the fish. Currently popular fish finders take two different forms. In one form, the fish finder has a liquid crystal display that presents a scrolling picture of the bottom, suspended fish, and submerged structure such as weeds, trees, and the like.

The other form of fish finder (referred to as a flasher) has a circular ring lens with an adjacent scale indicating distance below the transducer. The location of the transducer appears at the top of the ring at the 12 o'clock or 0° position. A motor driven disc or spinner carrying multiple colored light sources rotates behind the lens. As the disc rotates, light is emitted by the light sources at different positions around the ring to represent sonar returns from suspended fish or other objects, as well as from the bottom. The color of the light flashes represents the signal intensity of the sonar return, and the angular position of the flash represents a depth of the fish, object, or bottom from the transducer. Examples of flasher type fish finders are shown in Frederickson et al. U.S. Pat. No. 3,952,279; Yamamoto et al. U.S. Pat. No. 3,964,012; Grilk U.S. Pat. No. 4,644,512; Yamamoto et al. U.S. Pat. No. 5,973,997; Cummings et al. U.S. Pat. No. 6,768,701; Asakura U.S. Pat. No. 6,650,595; and Noda et al. U.S. Pat. No. 7,057,972.

SUMMARY

According to the present invention, a flasher sonar device includes a motor driven flasher that produces light output pulses at angular positions along a flasher ring lens based upon sonar returns. A liquid crystal display (LCD) positioned concentrically with the flasher ring lens displays a dynamic annotated range scale associated with the flasher ring lens. A controller coordinates operation of the motor driven flasher and the LCD.

BRIEF DESCRIPTION OF THE DRAWINGS

FIG. 1A is an exploded view of one embodiment of the flasher sonar device of the present invention.

FIGS. 12A-17A show front views of the LCD display in unzoomed state.

FIGS. 12B-17B show front views of the LCD display in a zoomed state.

FIGS. 19A-19J illustrate information displayed on the LCD display in response to different input selections.

DETAILED DESCRIPTION

Figure 1B:
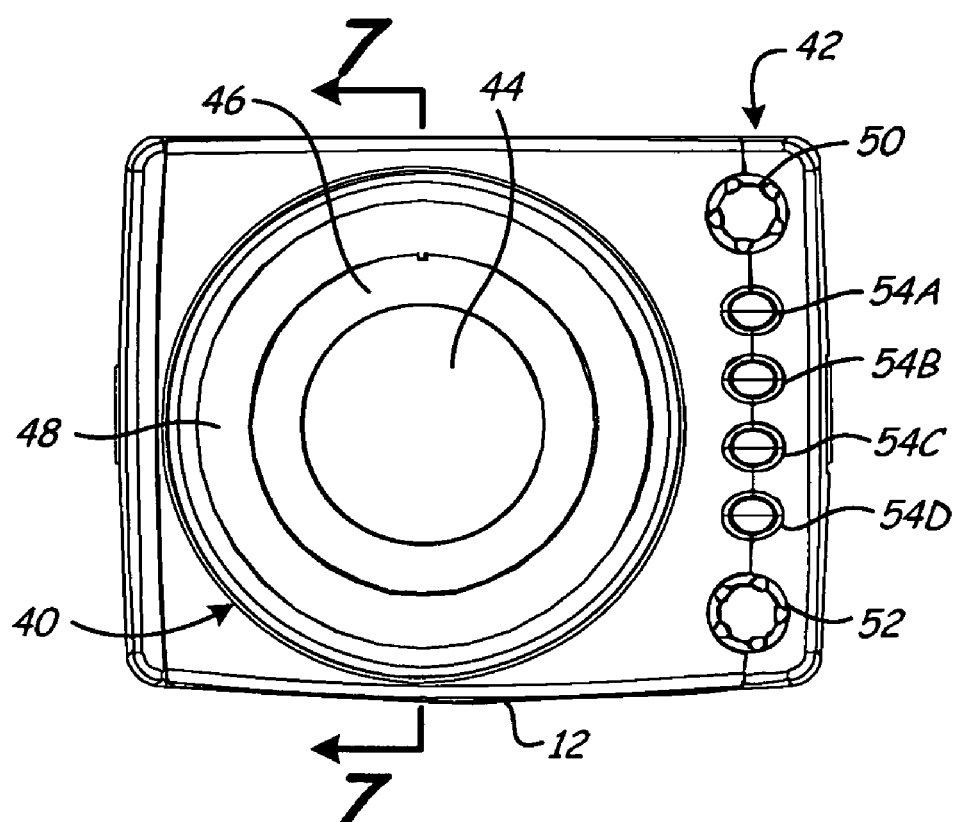
FIG. 1B is a front view of one embodiment of the flasher sonar device.

FIG. 1A shows an exploded view of one embodiment of flasher fish finder 10, which includes front housing assembly 12, gasket 14, liquid crystal display (LCD) module 16, flex connector 18, LCD module mounting screws 20, spinner assembly 22, main printed circuit board assembly 24, motor 26, flex connector 28, main PCB mounting screws 30, rear housing assembly 32, and main housing screws 34.

On its front face (shown in FIG. 1B), front housing assembly 12 includes flasher display 40 and user inputs 42. Flasher display 40 includes LCD display lens 44, lens overlay ring 46 (which surrounds LCD display lens 44), and flasher ring lens 48 (which surrounds overlay ring 46). In the embodiment shown in FIG. 1B, user inputs 42 include encoder knob 50, selector knob 52, and keys 54A-54D. In other embodiments, two additional keys 54E and 54F are also included (see FIGS. 9A-11D).

LCD module 16 is positioned behind LCD display lens 44 and provides both alphanumeric information and icons. LCD module 16 cooperates with graduation markers on overlay ring 46 to provide dynamic annotated range scales for flasher display 40. Depending upon the range selected using selection knob 52, LCD module 16 provides the numerical values corresponding to the graduations, so that the user sees the appropriate numerical depth value for the selected range.

LCD module 16 also displays a digital depth value and provides visual feedback for settings such as sensitivity and noise. User interface icons and words are displayed by LCD module 16 to allow the user to quickly determine the current settings and operating modes of fish finder 10.

The flasher light signals that appear through flasher ring lens 48 are produced by spinner assembly 22, which is mounted behind LCD module 16. Flasher ring lens 48 can be any circular or annular window, and is typically a transparent plastic ring with annular, concentric grooves. Spinner assembly 22 is a cup shaped unit that is mounted on the output shaft of motor 26. Spinner assembly 22 carries a rotating fiber optic light pipe that has an inlet end at the center of spinner assembly 22, and an outlet end at the outer periphery of spinner assembly 22. Light is provided to the inlet end of the fiber optic light pipe by a multicolor LED source mounted on the back side of LCD module 16.

Spinner assembly 22 also includes an interrupt arm (synchronization interrupter 154 shown in FIGS. 5A and 5B) that is used to synchronize flasher operation. Each time the interrupt arm passes through a detector carried on main circuit board 24, a synchronization pulse is generated which is used to calculate spinner speed and top dead center position.

Main circuit board assembly 24 carries electronic circuitry that processes inputs from user interface, control operations of the sonar transducer (not shown), processes sonar return signals, and controls operation of LCD module 16 and spinner assembly 22. Flex connector 18 connects LCD module 16 to main circuit board 24. Flex connector 28 connects the user inputs 42 from front housing assembly 12 to main circuit board 24.

Rear housing assembly 32 carries a connector panel on its rear surface. The connector panel provides electrical connection to a dual frequency/dual beam sonar transducer and to a battery power cable.

When the components shown in FIG. 1A are assembled, LCD assembly 16 is attached to front housing assembly 12 by screws 20. Spinner assembly 22 is press fit onto the shaft of motor 26, and main circuit board 24 is attached to front housing assembly 12 by screws 38. FIG. 1C shows flasher 10 with all components assembled, except for rear housing assembly 32.

Gasket 14 provides a seal between front housing assembly 12 and rear housing assembly 32 when they are assembled. Screws 34 attach rear housing assembly 32 to front housing assembly 12.

Figure 2A:
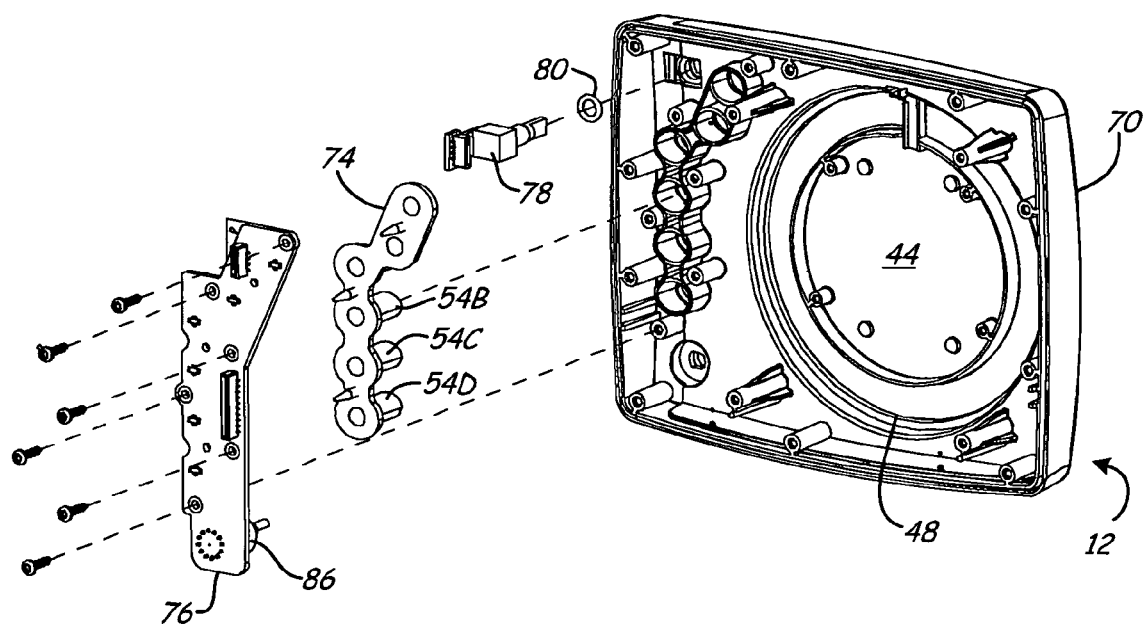
FIG. 2A shows an exploded perspective view from the rear of the front housing assembly of the flasher of FIGS. 1A-1C.
Figure 2B:
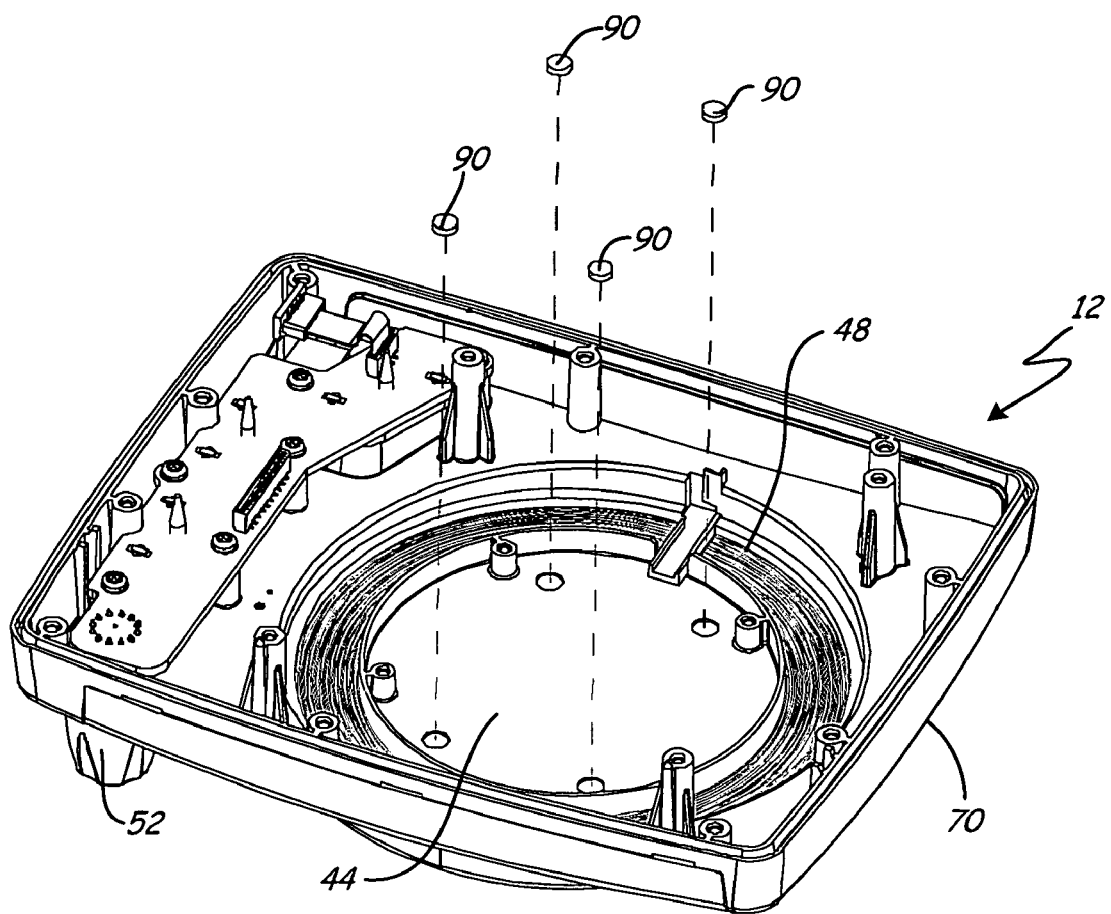
FIG. 2B is a rear perspective view of an assembled front housing assembly, with display support foam pads shown in exploded view.
Figure 2C:
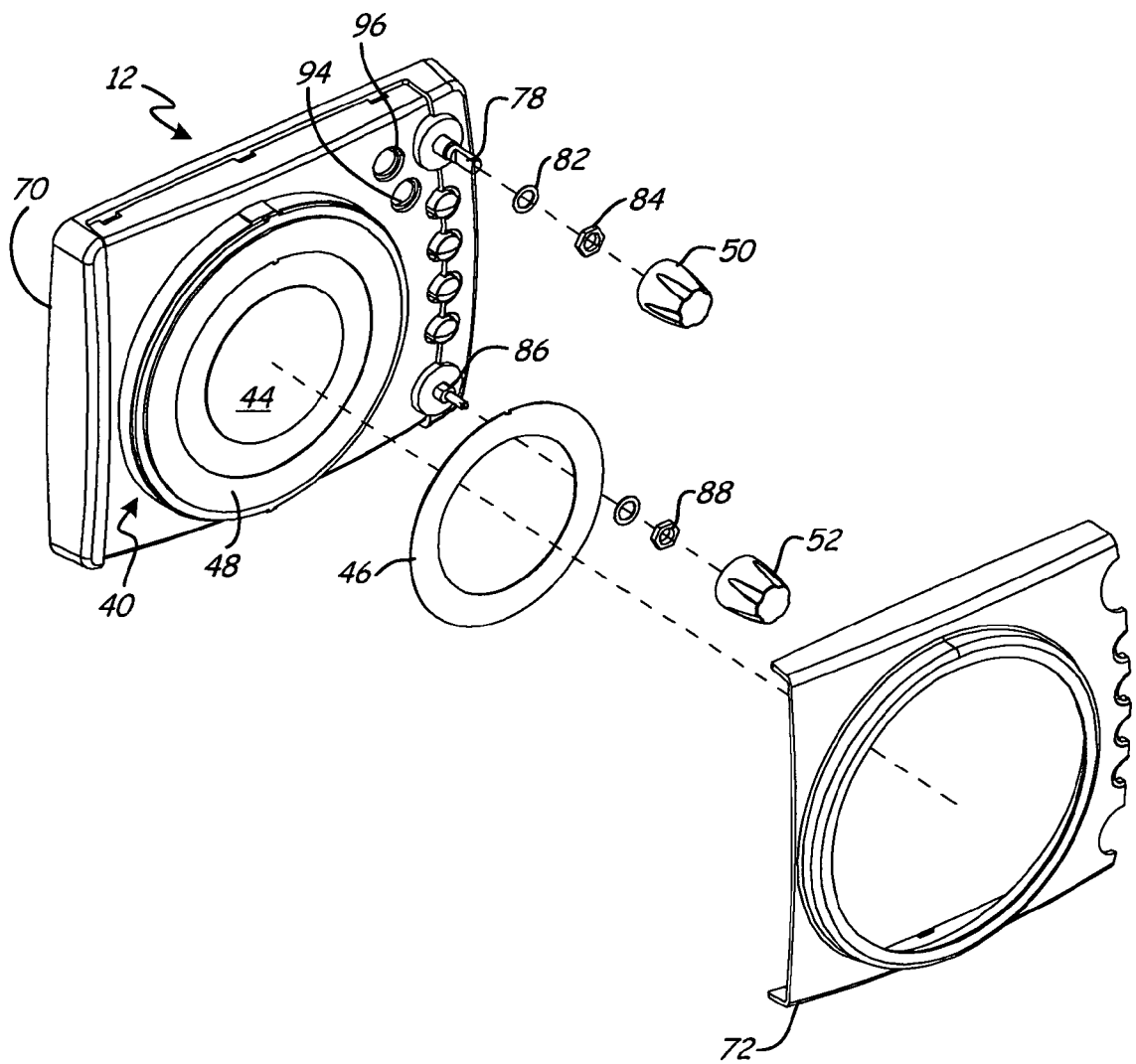
FIG. 2C is an exploded front perspective view of the front housing assembly.

FIGS. 2A-2C show front housing assembly 12. Front housing assembly 12 includes lens overlay ring 46, encoder knob 50, selector knob 52, front housing 70, bezel 72, key pad 74 (including keys 54A-54D), key pad printed circuit board 76, encoder module 78 (with washers 80 and 82 and nut 84), rotary selector switch 86 (and nut 88), display support foam elements 90, and screws 92. As can be seen in FIGS. 2A-2C, front housing 70 includes two additional apertures 94 and 96 for two additional keys. In the embodiment shown in FIGS. 2A-2C, bezel 72 covers apertures 94 and 96, so that only four keys 54A-54D are accessible. In another embodiment, bezel 72 includes apertures with a line with apertures 94 and 96 so that six input keys 54A-54F (shown in FIG. 9A) are available. This allows additional functions to be provided, as will be discussed later in this application.

Figure 3A:
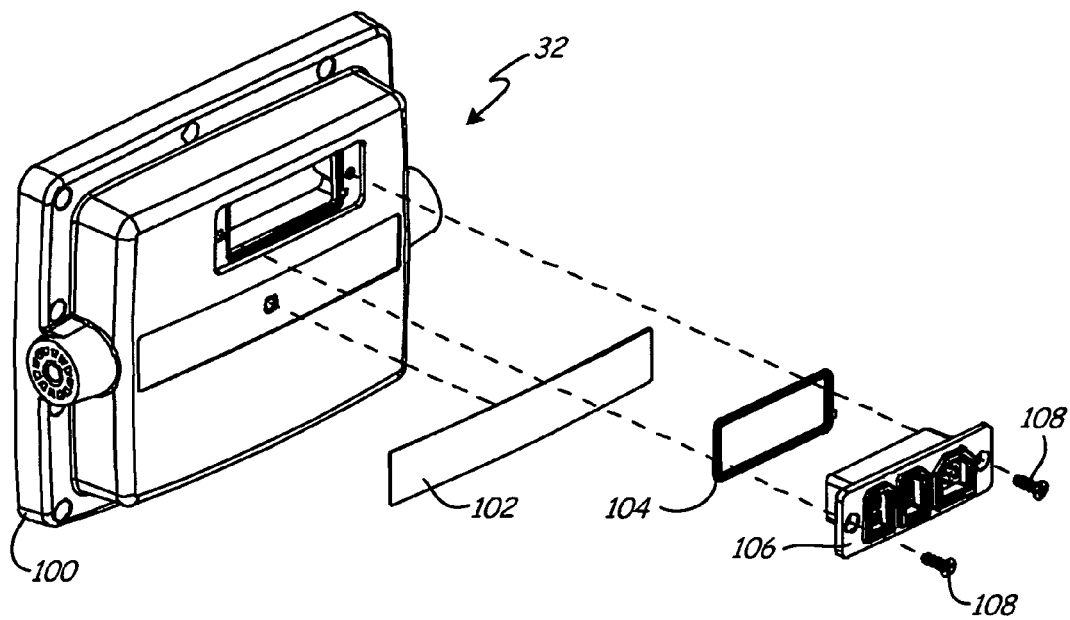
FIG. 3A is an exploded view of the rear housing assembly.
Figure 3B:
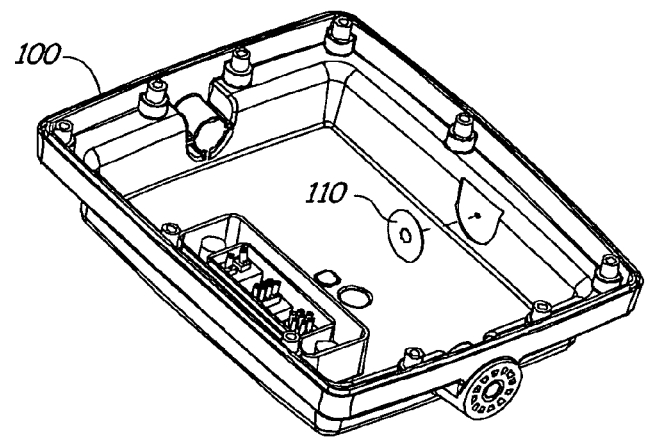
FIG. 3B is a perspective view showing the inside of the rear housing assembly.

FIGS. 3A and 3B show rear housing assembly 32, which includes rear housing 100, label 102, gasket 104, connector panel 106, screws 108, and water tight air vent 110.

Figure 4A:
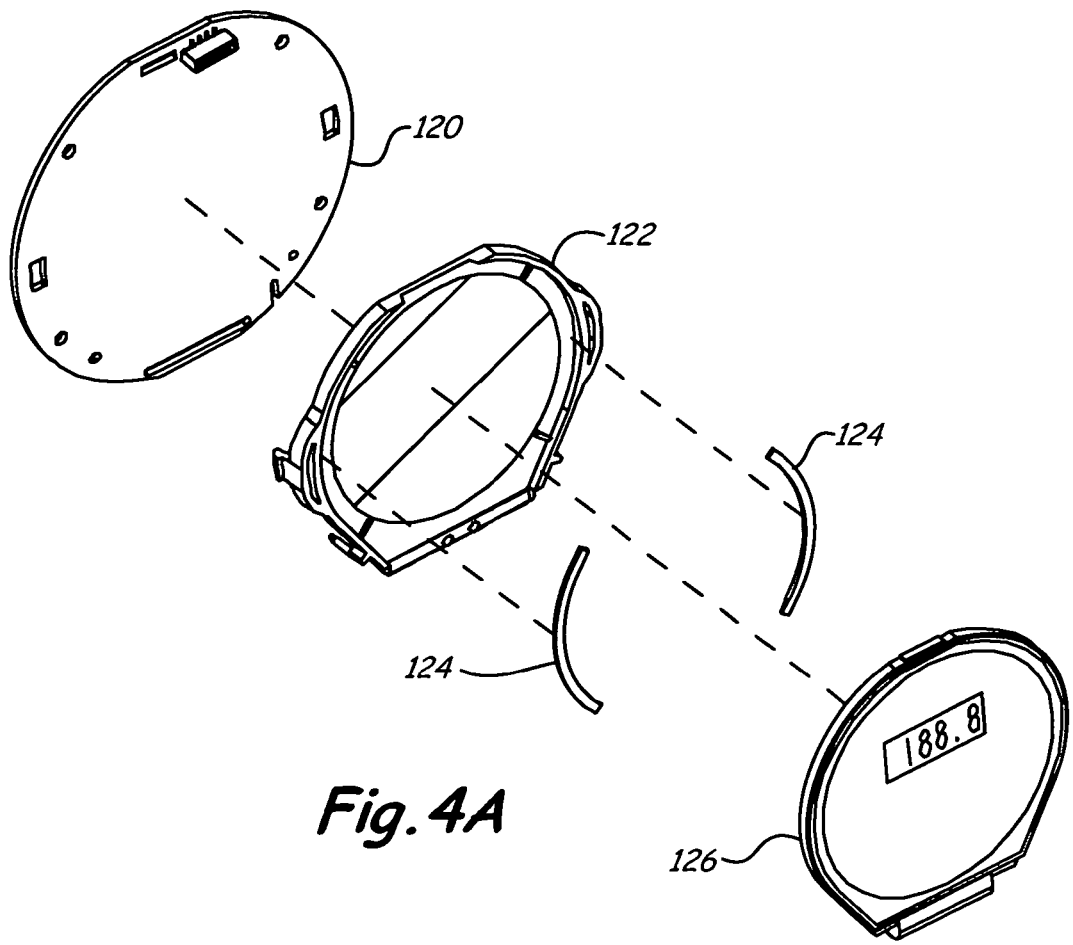
FIG. 4A is an exploded view of the LCD display module.
Figure 4B:
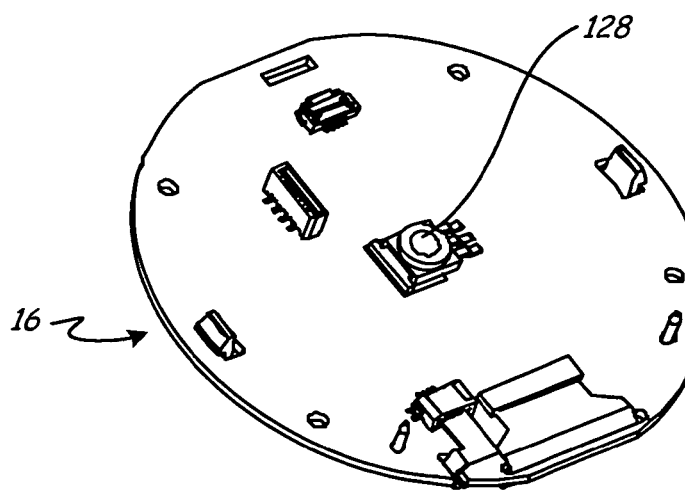
FIG. 4B is a perspective view showing the rear side of the LCD display module.

FIGS. 4A and 4B show LCD module 16, which includes printed circuit board 120, back light assembly 122, LCD support foam 124, and LCD display 126. On the back side of LCD module 16 (as shown in FIG. 4B), multicolor LED light source 128 is mounted so that it will be aligned with the axis of rotation of spinner assembly 22. The LED source 128 includes multiple light emitting diodes for emitting red, green, and blue light. By varying the intensity of red, green, and blue light emitted from the light emitting diodes, a full spectrum of different colors, including white, can be generated.

Figure 5A:
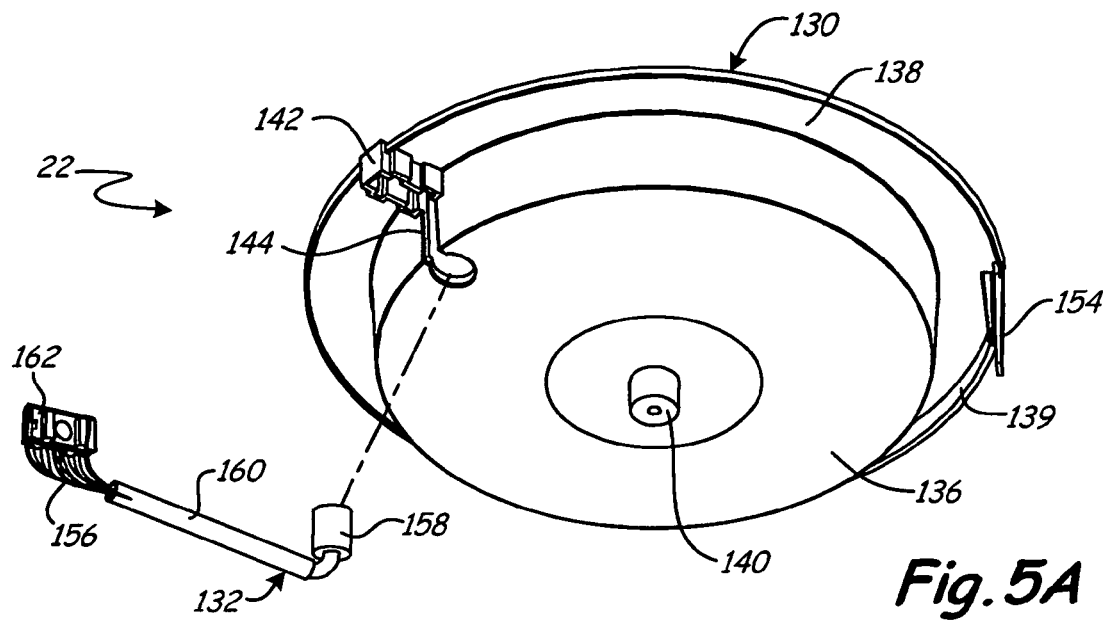
FIG. 5A is an exploded view from the rear of the spinner assembly.
Figure 5B:
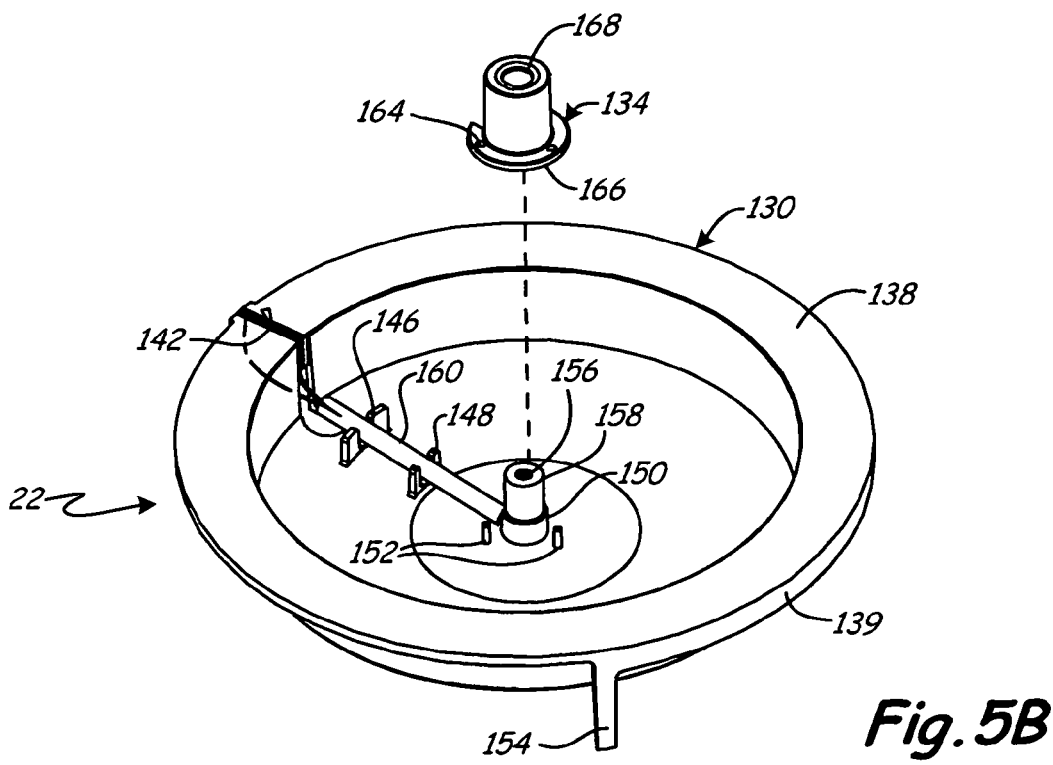
FIG. 5B is an exploded view from the front side of the spinner assembly.

FIGS. 5A and 5B show spinner assembly 22, which includes spinner disc 130, light pipe assembly 132 and light pipe cap 134. Spinner disc 130 includes center cup 136, outer flange 138, counterweight rim 139, hub 140, light output area 142, access slot 144, fiber optic cradles 146 and 148, inlet end holder 150, mounting pins 152, and synchronization interrupter 154.

Light pipe assembly 132 includes a bundle of optical fibers 156, inlet end 158, sleeve 160, and outlet end 162. Optical fibers 156 are arranged in a circular bundle at inlet end 158. They pass as a bundle through sleeve 160, and then are arranged in a fan shaped arrangement in outlet end 162. Inlet end 158 is supported by inlet end holder 150 of spinner disc 130. Cradles 146 and 148 hold sleeve 160 in place. Slot 144 in spinner disc 130 is shaped to allow insertion of inlet end 158 and sleeve 160 into cup 136, while allowing optical fibers 156 to pass from the interior of cup 136 to light output area 142. The male portion of outlet end 162 of light pipe assembly 132 is received in the female portion of light output area 142 on the back side of flange 138. The top surface of flange 138 has a matte finish which is relatively dark and non-reflective. Counterweight rim 139 is attached to flange 138 opposite of light pipe assembly 132 in order to balance spinner disc 130 when spinning.

Light pipe cap 134 fits over inlet end 158 of light pipe assembly 132 and inlet end holder of spinner disc 130. Pins 152 extend through holes 164 in flange 166 of light pipe cap 134. Center aperture 168 of cap 134 is aligned with fibers 156 at inlet end 158 of light pipe assembly 132.

Figure 5C:
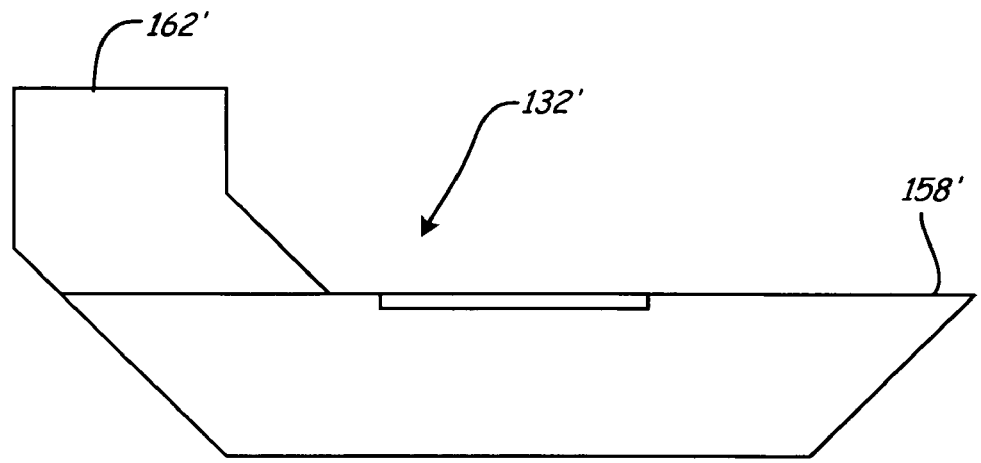
FIG. 5C is a side view of an alternative embodiment of a light guide assembly.
Figure 5D:
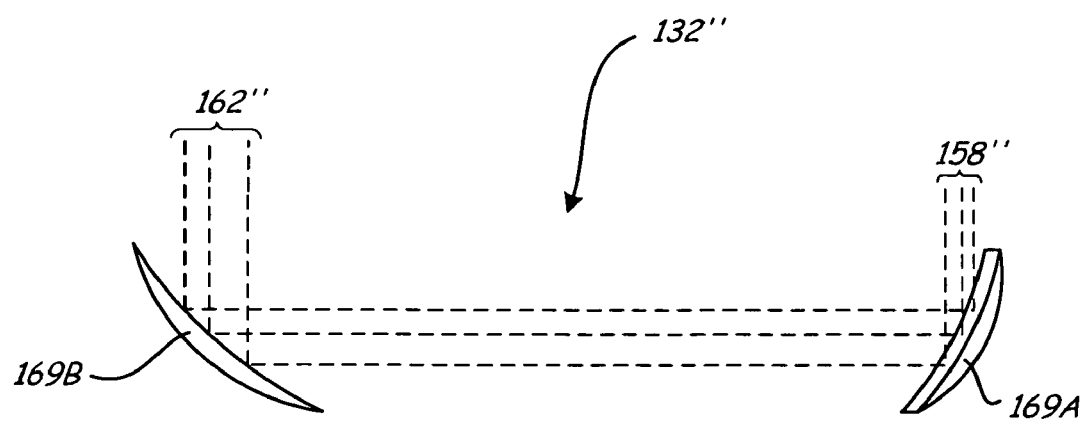
FIG. 5D is a side view of another alternative embodiment of a light guide assembly.

In other embodiments, light pipe assembly 132 could be one of a variety of light guides that can receive light from light source 128 at inlet end 158 and emit it at outlet end 162. FIG. 5C illustrates an alternative embodiment of a light guide assembly. Light guide assembly 132' includes a single element light pipe as opposed to including bundle of optical fibers 156. Light guide assembly 132' functions similarly to light pipe assembly 132 in that light enters at inlet end 158' and is emitted at outlet end 162'. FIG. 5D illustrates another alternative embodiment of a light guide assembly. Light guide assembly 132" includes a series of mirrors 169A and 169B configured to concentrate and reflect light emitted from light source 128. Mirror 169A can be an optically reflective surface configured to gather light at input end 158" from light source 128 and reflect it to mirror 169B. Mirror 169B can be an optically reflective surface configured to receive light from mirror 169A and reflect collimated light out outlet end 162" toward flasher ring lens 48. In still other embodiments, a light guide assembly can be a hybrid that includes a single-element light pipe together with a bundle of optical fibers or a hybrid that includes a curved mirror together with a bundle of optical fibers. In each of these embodiments, the light guide can direct light from the inlet end to an outlet end in a concentrated beam.

Figure 6A:
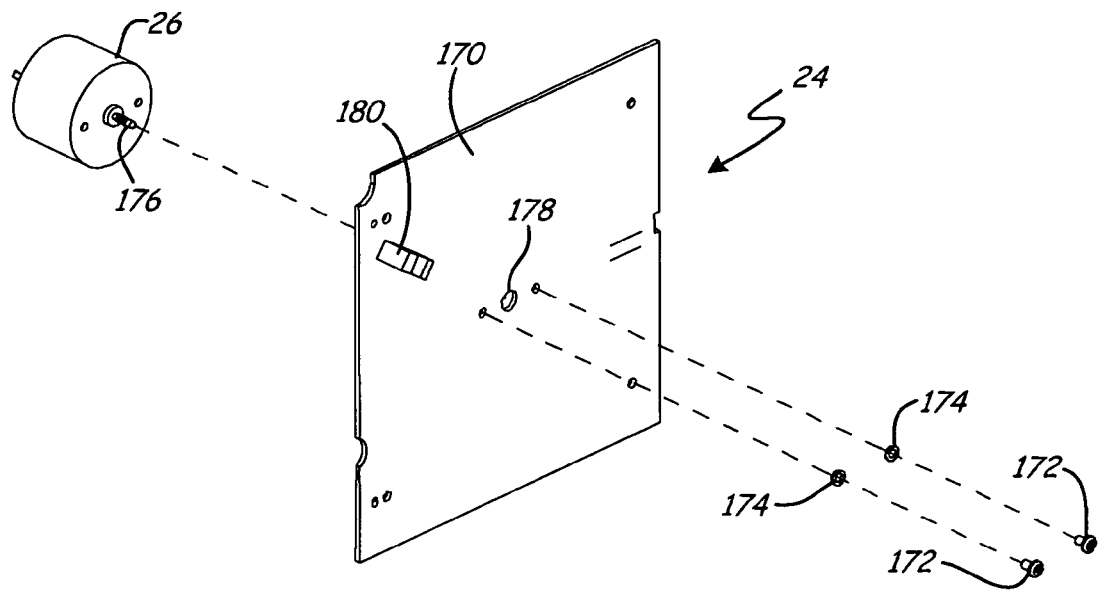
FIG. 6A is an exploded view generally from the front side of the main circuit board and motor assembly.
Figure 6B:
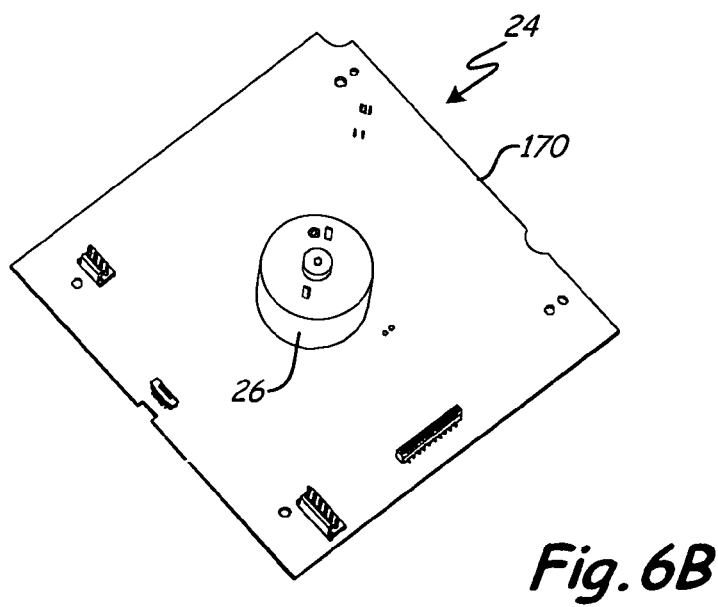
FIG. 6B is a perspective view showing the rear side of the main circuit board and motor assembly.

FIGS. 6A and 6B show main circuit board assembly 24. In these views, individual electronic components mounted on circuit board assembly 24 are not shown. In FIGS. 6A and 6B, motor 26 is mounted on printed circuit board 170. Screws 172 and lock washers 174 attach motor 26 to the back side of circuit board 170. Shaft 176 of motor 26 extends through central aperture 178 in circuit board 170, so that it can be attached to hub 136 of spinner assembly 22.

As shown in FIG. 6A, optical sensor 180 is mounted on the front side of circuit board 170. Optical sensor 180 is a top dead center indicator that is positioned to detect interrupter 154 of spinner assembly 22 each time interrupter 154 passes through optical sensor 180. This causes a synchronization pulse to be generated that is used by the circuitry carried on circuit board 170 to produce the top dead center reference line on the flasher display.

Figure 1C:
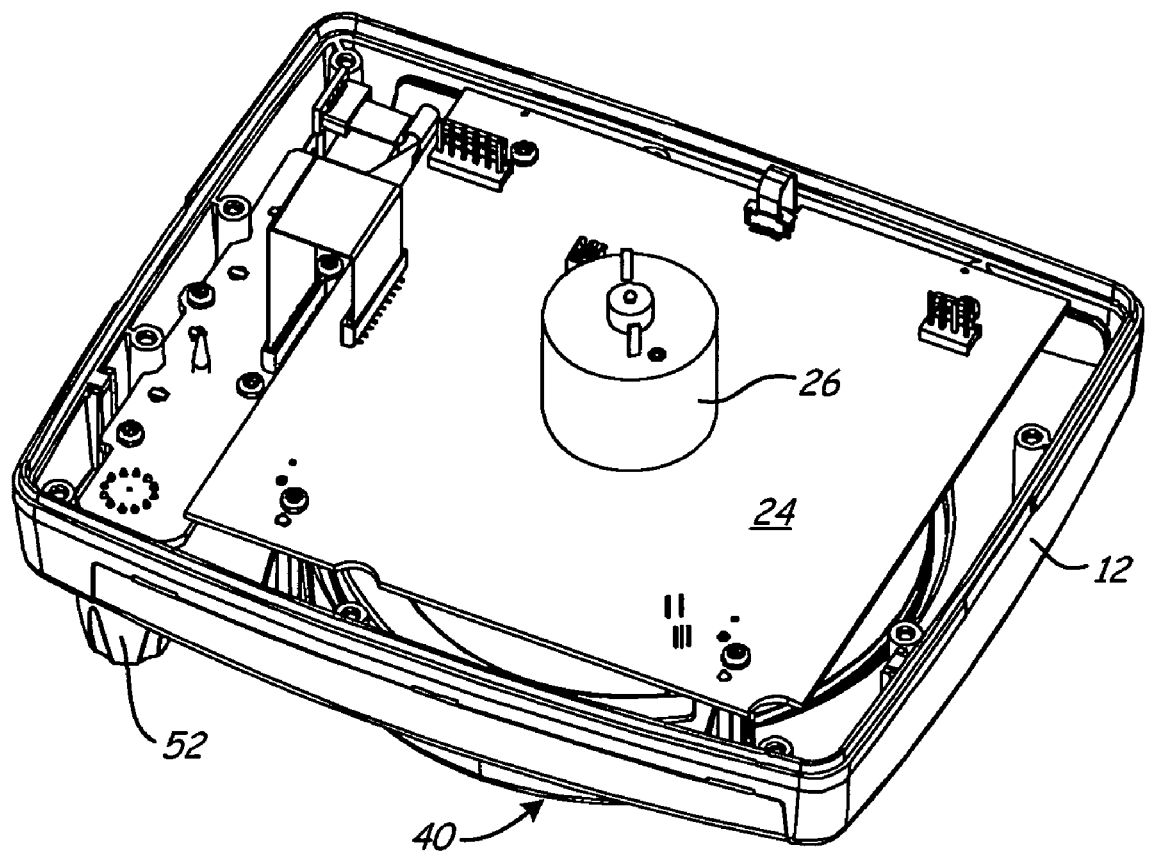
FIG. 1C is a perspective view, from the rear of the sonar device of FIG. 1A with the rear housing assembly removed.
Figure 7:
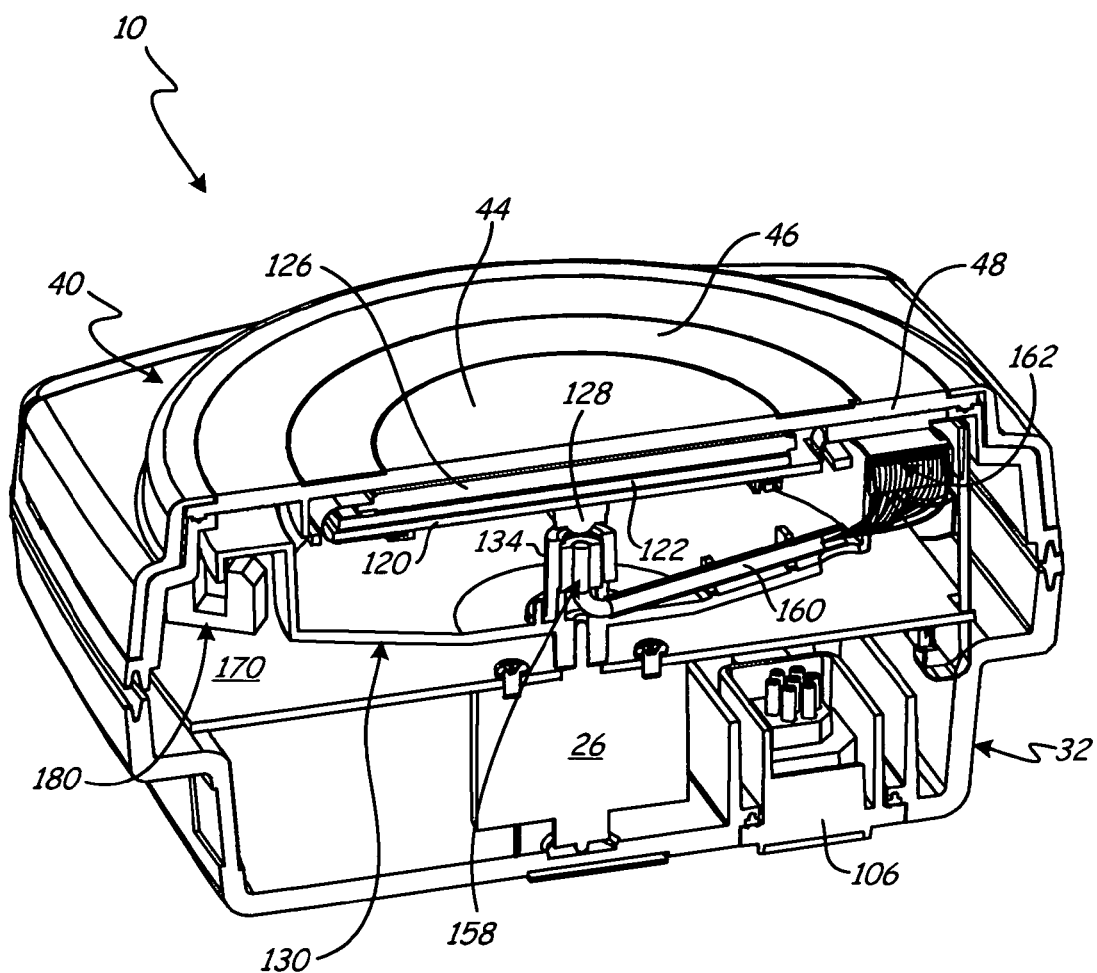
FIG. 7 is a sectional view along section 7-7 of FIG. 1B.

FIG. 7 is a perspective view of flasher fish finder 10, sectioned along section 7-7 of FIG. 1B.

Figure 8:
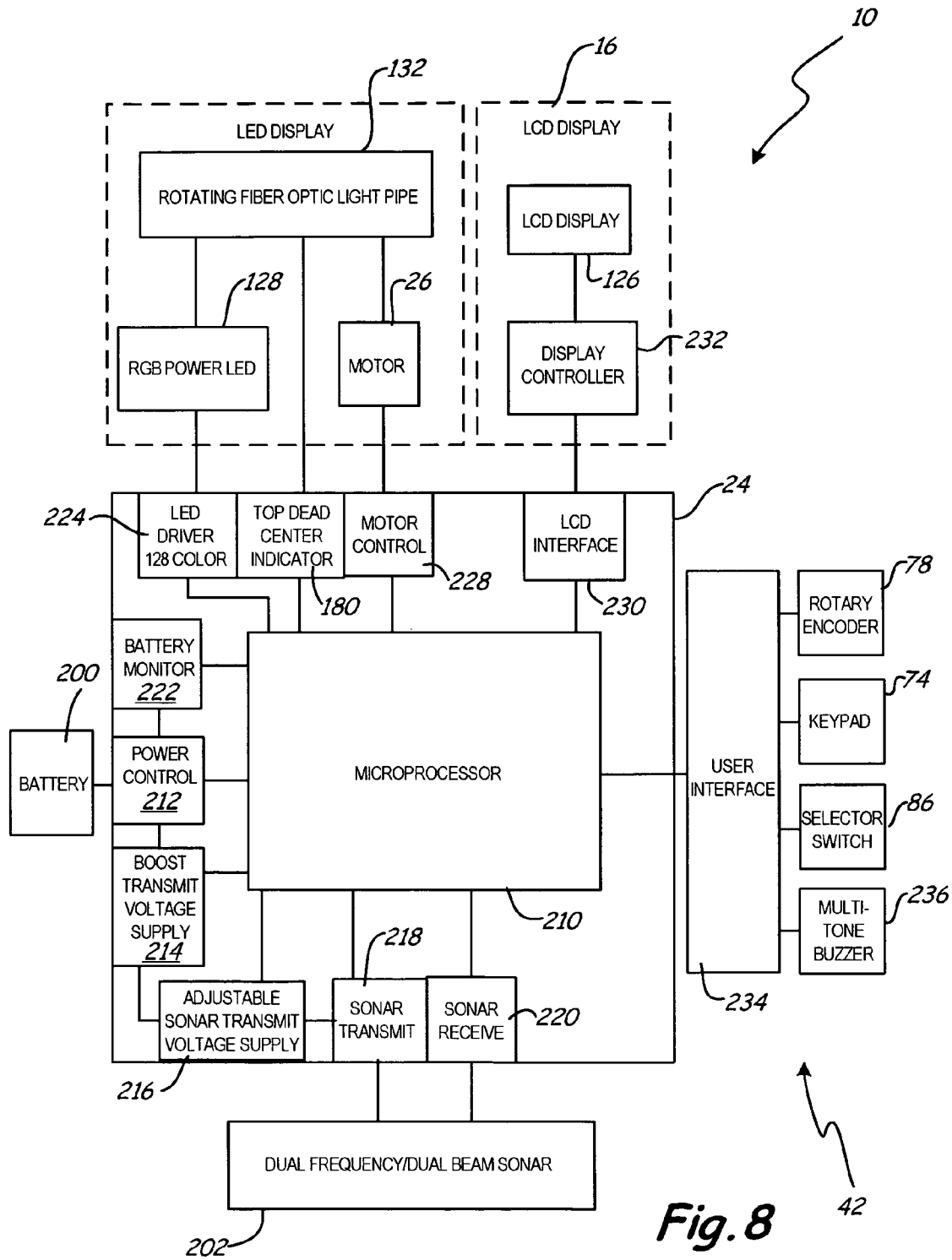
FIG. 8 is a block diagram of the flasher sonar device.

FIG. 8 is a block diagram of flasher fish finder 10. The main components shown in FIG. 8 are LCD module 16, main control board 24, user interface 42, the LED flasher display (formed by motor 26, LED light source 128 and light pipe assembly 132), battery 200, and dual frequency/dual beam sonar 202. Operation of flasher fish finder 10 is coordinated and controlled by microprocessor 210 on main circuit board 24.

Main circuit board 24 also includes power control 212, boost transmit voltage supply 214, adjustable sonar transmit voltage supply 216, sonar transmit circuitry 218, sonar receive circuitry 220, battery monitor 222, LED driver 224, top dead center indicator 180, motor control 228, and LCD interface 230.

LCD module 16 includes LCD display 126 and display controller 232. User interface 42 includes user interface circuitry 234, keypad 74, rotary encoder 78, selector switch 86, and multitone buzzer 236. Flasher display 46 includes spinner assembly 22, motor 26, and LED 64.

Battery 200 provides electrical power to power control 212 on main circuit board 24. Power control 212 turns on and off power to all of the components of flasher 10. It also includes voltage regulation circuitry to provide the voltages required by the logic circuitry of flasher fish finder 10. Boost transmit voltage supply 214 increases the voltage from power control 212 to 30 volts from the battery voltage of 12 volts. The 30 volt output of boost transmit voltage supply 214 is provided to adjustable sonar transmit voltage supply 216, which provides the power to sonar transmit circuitry 218. Microprocessor 12 can control adjustable sonar transmit voltage supply 216 in order to adjust the sonar power used to drive dual frequency/dual beam sonar 202 as a function of water depth.

In one embodiment, sonar transducer 212 is driven at one of two different frequencies: about 240 kHz for a wide beam and about 455 kHz for a narrow beam. The wide beam gives greater lateral coverage, while the narrow beam provides less coverage but higher resolution.

Sonar receive circuitry 212 receives the sonar returns from transducer 202, and provides them to microprocessor 210. Signal processing of the sonar returns, including noise settings, and gain settings can be achieved by adjusting thresholds used by microprocessor 210 in processing the sonar return signals. Microprocessor 210 stores the intensity of sonar return signals in bins based on the time between the sonar transmit pulse and the receipt of the sonar return signal.

Microprocessor 210 controls the flasher display based upon stored sonar returns and the top dead center signal received by top dead center indicator (optical sensor) 180. The top dead center indication (which indicates when interrupter 154 passes through optical sensor 180) allows microprocessor 210 to synchronize the light output of multicolor LED 128 (and therefore the fiber optic light pipe 132) with rotation of spinner assembly 22. Microprocessor 212 provides drive signals to LED 128 through LED driver 224. The color of the light generated by LED 128 is dependent upon the color selected by microprocessor 210 with LED driver 224. In one embodiment, LED 128 is a Harvatek red, green, blue power LED module.

Microprocessor 210 controls the rotation of spinner assembly 22. Motor control signals that are provided by microprocessor 210 to motor control 228, which controls the speed of motor 26.

Microprocessor 210 controls operation of LCD display 126 through LCD interface 220 and display controller 232. Depending upon the inputs microprocessor 210 receives from user interface 42, different information can be displayed on LCD display 126 to provide a number of different display features and other functionality.

Microprocessor 210 receives input signals through interface circuitry 234 from rotary encoder 78, keypad 74, and selector switch 86. Multitone buzzer 236 provides an audio feedback to the user when keys on keypad 74 are pressed. Microprocessor 210 provides signals to multitone buzzer 236 in response to detected key presses on keypad 74.

Battery monitor 222 monitors the power from battery 200 to provide a signal representing the state of charge of battery 200. Upon receiving an input from keypad 74 requesting battery status, microprocessor 210 causes a battery percentage value to be displayed on LCD display 126.

Figure 9A:
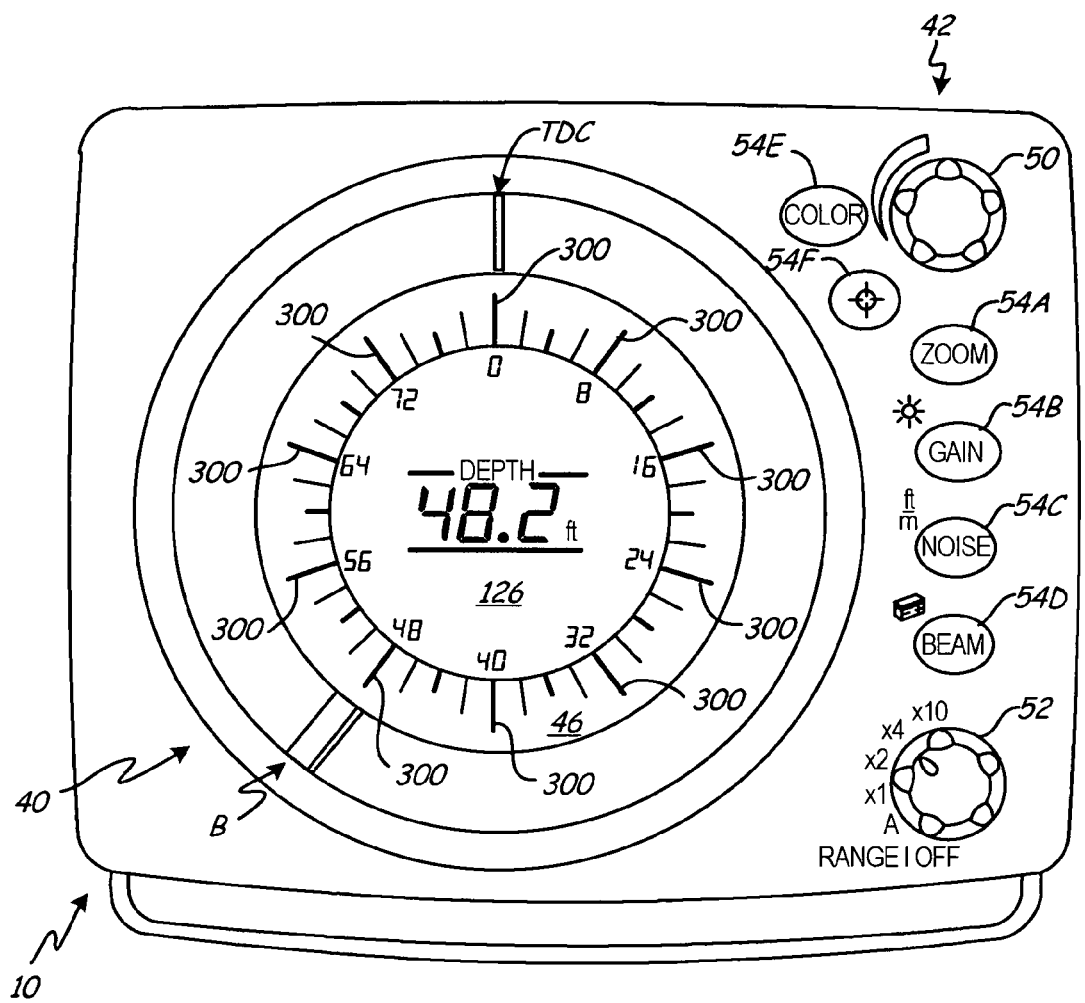
FIGS. 9A-9B are front views of an embodiment of the flasher sonar device illustrating the dynamic depth range feature.
Figure 9B:
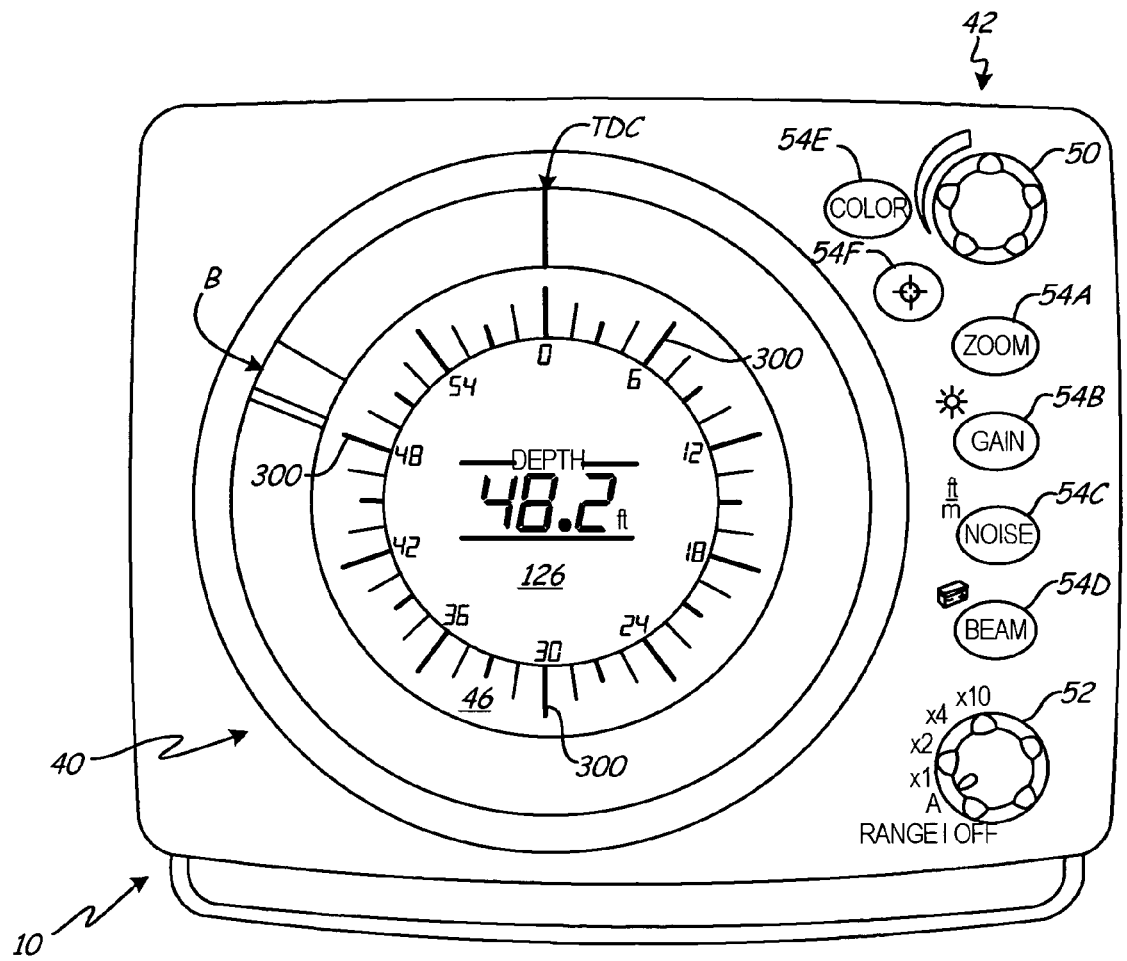

The use of LCD display 126 in conjunction with the flasher display allows flasher 10 to provide a number of unique features that will be described in more detail with reference to FIGS. 9A-19J. FIGS. 9A and 9B illustrate a dynamic depth range feature of flasher 10. FIGS. 10A-10G illustrate operation of an active cursor or target depth feature. FIGS. 11A-11D illustrate operation of a zoom feature, as do FIGS. 12A-17A and 12B-17B. FIGS. 18A, 18B, and 19A-19J show how different information can be displayed on LCD display 126 depending upon the particular feature selected by the user through user interface 42.

In each of FIGS. 9A-11D, a front view of flasher 10 is shown. User interface 42 includes rotary encoder knob 50, select switch knob 52, zoom key 54A, gain key 54B, noise key 54C, beam key 54D, color key 54E, and cursor key 54F.

LCD display 126, ring overlay 46, and flasher ring 48 provide a variety of different output alternatives, depending upon the particular inputs provided by the user through user interface 42. Ring overlay 46 is positioned concentrically between LCD display 126 and flasher ring lens 48. Ring overlay defines a scale that includes ten major graduations 300 that are separated by arcs of 36 degrees. The uppermost or top dead center graduation represents the location of the sonar transducer, i.e. a depth of zero. The distance between each pair of major graduations is divided into four segments of 9 degrees each.

The depth represented by the distance between major graduations 300 can vary depending upon the range selected by the position of rotary selector knob 52. When the units of measurement are feet, the distance between two major graduations 300 can be as small as 2 feet and as large as 20 feet.

Rotary selector knob 52 shown in FIG. 9A has six possible positions: Off, A (automatic range selection), X1, X2, X4, and X10. When knob 52 is in the Off position, flasher 10 is turned off. The X1 position indicates the smallest range, in which each distance between major graduations 300 is 2 feet. In that case, the full range of flasher display 40 is 0 to 20 feet.

The X2 position of rotary selector knob 52 selects a range in which the distance between major graduations 300 is twice the base distance provided by the X1 setting. In other words, the X2 setting will produce a display in which the distance between major graduations 300 represents 4 feet. In that case, a full range in the X2 position represents 0 to 40 feet.

The X4 position, which is the position shown in FIG. 9A, produces a distance between major graduations that is 4 times the base distance. When the units are in feet, this results in increments between major graduations equal to 8 feet. In FIG. 9A, LCD display 126 labels major graduations in 8 foot increments, and the full range of the flasher display represents 0 feet to 80 feet.

The X10 position of rotary selector knob 52 will provide increments between major graduations 300 that are 10 times the base increments used for the X1 range. When the units of measurement are feet, the X10 range produces an increment of 20 feet between major graduations and a full range of 0 to 200 feet.

The A range setting of rotary selector knob 52 selects an automatic range feature. In that case, microprocessor 202 selects a range based upon the distance to bottom which will yield the best utilization of the full 360° of the flasher display. As a greater portion of the 360° available on the flasher display is used to represent the water column between the transducer and bottom, the resolution of the flasher signals displayed becomes better. This is because microprocessor 210 stores sonar return data in much finer resolution than that which is normally displayed. As the scale is expanded to best fit the 360° available for display, the data available from microprocessor 210 can be shown in more resolution. Microprocessor 210 will select a range from among the standard range settings (X1 to X10), or intermediate range settings if they provide a better fit. FIG. 9B illustrates operation in the automatic range mode. In this case, a best fit is provided by increments of 6 feet between major graduations. This would correspond to an X3 range, which is not one of the preset ranges available by turning rotary selector knob 52. Other range options automatically selectable include X5, X6, X7, X8, and X9. In another embodiment, a variety of possible range combinations can be selected manually by rotary selector knob 52 or automatically by microprocessor 202. The range combinations can include different units of linear measurement (such as metric units) or simply include different numbers than those chosen in the illustrated embodiment.

In the case illustrated in FIG. 9B, the depth bottom is 48.2 feet. By selecting an X3 range automatically, a full range displayed is from 0 to 60 feet, so that a depth of 48.2 feet results in the best utilization of the full range of flasher display 40. If X2 range were selected, the range would be from 0 to 40 feet, which would result in the bottom not appearing on flasher display 40. If an X4 range were selected, the full range would be 0 to 80 feet, meaning that more than half of the full range of flasher display 48 is used (as illustrated in FIG. 9A). A comparison of FIGS. 9A and 9B show the better utilization and higher resolution possible with the auto-range feature.

Although these examples have been given in terms of feet, similar functionality is provided when the units of measurement are meters. A base range is defined by the X1 range, and a maximum range is defined by the X10 range.

FIGS. 9A and 9B also illustrate the dynamic annotated range scale feature of flasher 10. LCD display 126 provides the numerical depth values adjacent each of the major graduations 300. In FIG. 9A, the depth at the top dead center graduation is "0". The numerical depth value displayed adjacent the first major graduation after top dead center is "8" representing 8 feet. Adjacent the next major graduation is "16" representing 16 feet, and so on. In the illustrated embodiment, the dynamic annotated range scale on LCD display 126 is adjacent to overlay ring 46, which, is adjacent to flasher ring lens 48. The graduations on overlay ring 46 cause the numbers of the dynamic annotated range scale to correspond to points on flasher ring lens 48. In another embodiment, the dynamic annotated range scale on LCD display 126 can be directly adjacent to flasher ring lens 48. In either embodiment, the dynamic annotated range scale is close enough to flasher ring lens 48 to be substantially adjacent to it.

In FIG. 9B, LCD display 126 again displays "0" at the top dead center graduation. The first major graduation after top dead center has the number "6" displayed on LCD display 126 to represent a depth of 6 feet. The next major graduation has the number "12" adjacent representing 12 feet. The numbers continue from "0" through "52" in FIG. 9B, in comparison to "0" through "72" in FIG. 9A.

The ability to provide dynamic annotated range scales allows meaningful information to be displayed at all times, regardless of the range being used. Unlike prior flashers having fixed numerical values on the depth scale, the user of flasher 10 does not need to multiply the numeric values adjacent graduations in order to determine the actual depth, and does not need to know the particular range being used before knowing how to interpret the information on flasher display 40. Instead, the numerical values corresponding to the major graduations are changed automatically by microprocessor 210 by providing appropriate signals to LCD display 126. A change of numerical values corresponding to the major graduations occurs each time a different fixed range setting is selected, when an automatic range change is made, or when a zoom feature is activated. Also, when a change is made from feet to meters, a similar adjustment will be made as necessary to the numbers displayed by LCD display 126 adjacent the major graduations. As a result, flasher 10 provides an intuitive easy to use and understand display of information. In the disclosed embodiment, the dynamic annotated range scale changes the numeric values for many different manual and automatic functions. In another embodiment, the dynamic annotated range scale can change numeric values manually or automatically for as few as a single function.

FIGS. 10A-10G illustrate an active cursor mode, which is selected by pressing cursor key 54F. If FIG. 10A, flasher display 40 shows top dead center reference mark TDC at 0 feet and bottom B near 48 feet. In addition, marks J and F appear at about 24 and about 26 feet respectively. Mark J represents a jig or lure, and mark F represents a suspended fish.

Figure 10A:
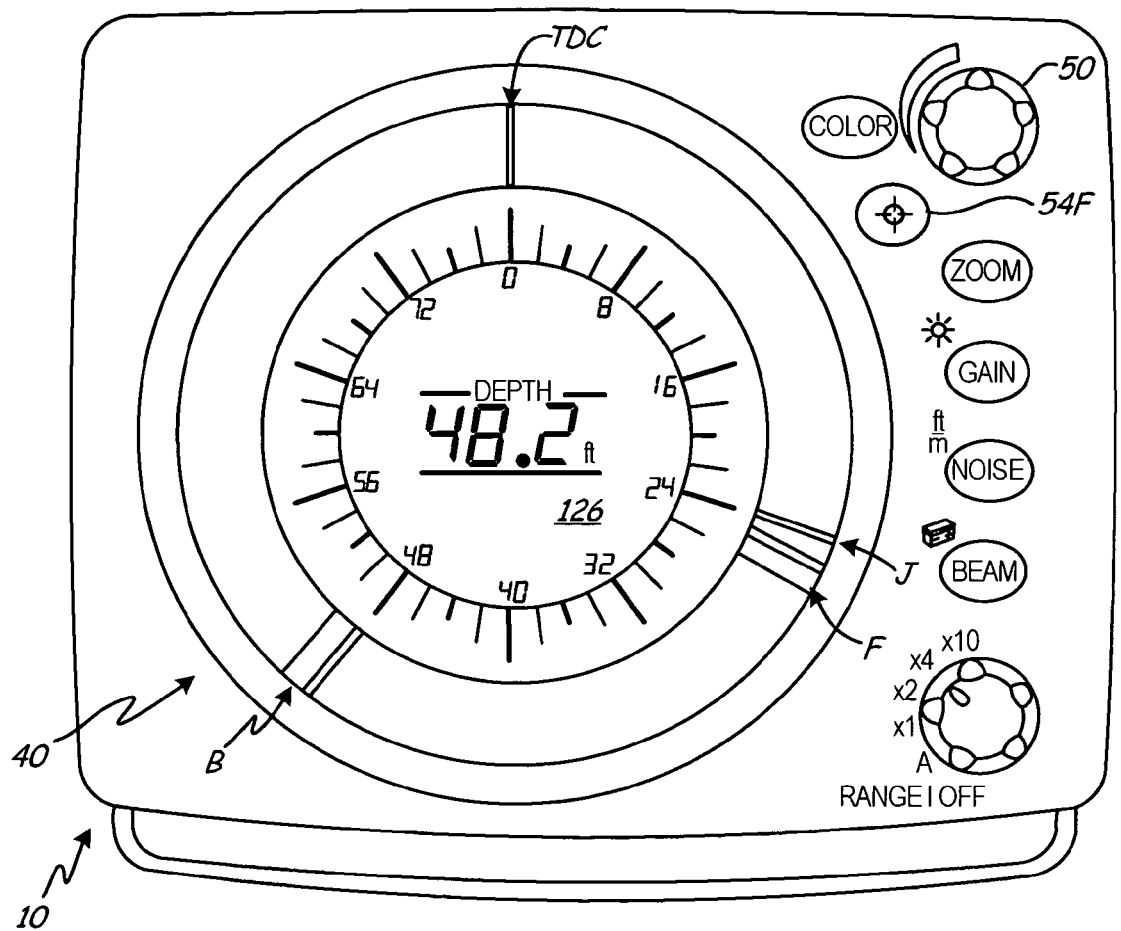
FIGS. 10A-10G are front views of the flasher sonar device illustrating the active cursor feature.
Figure 10B:
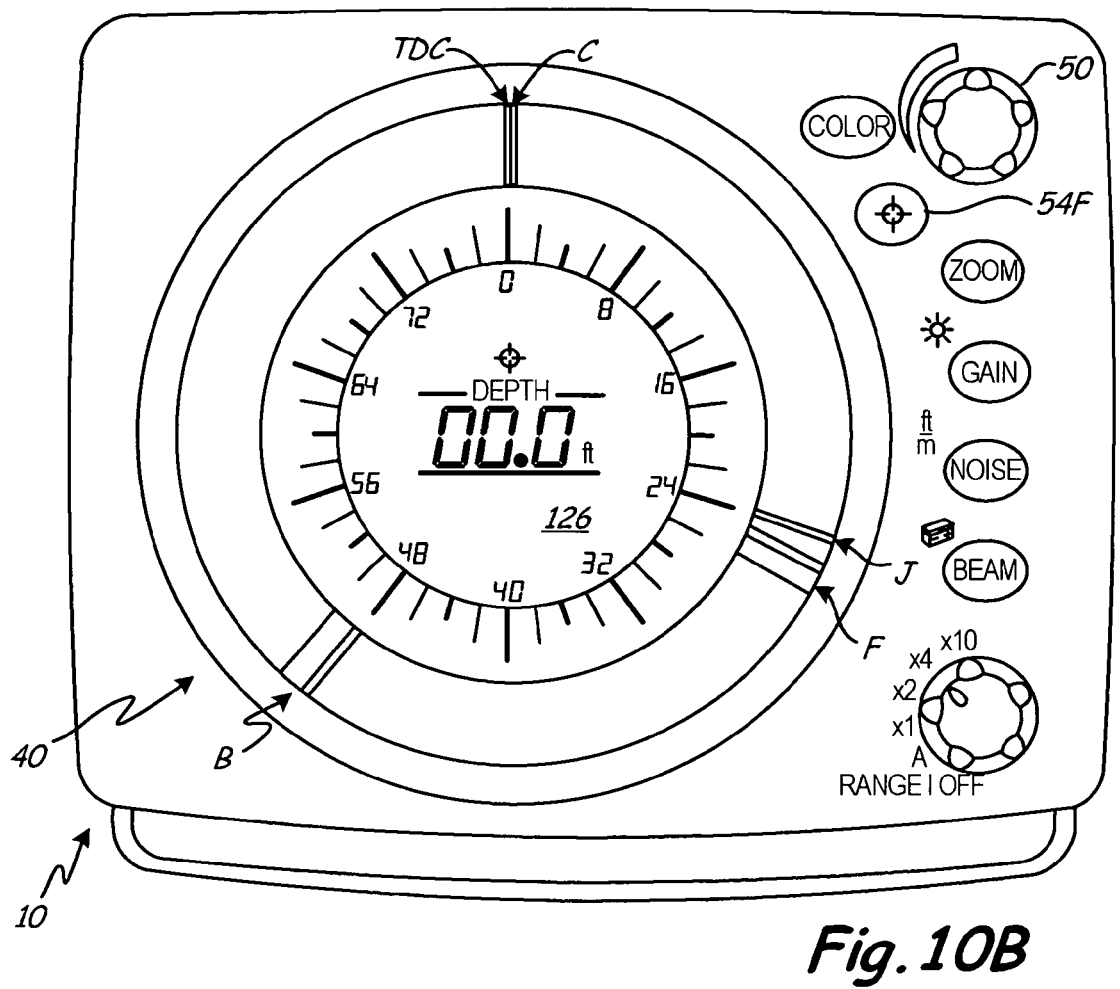
Figure 10C:
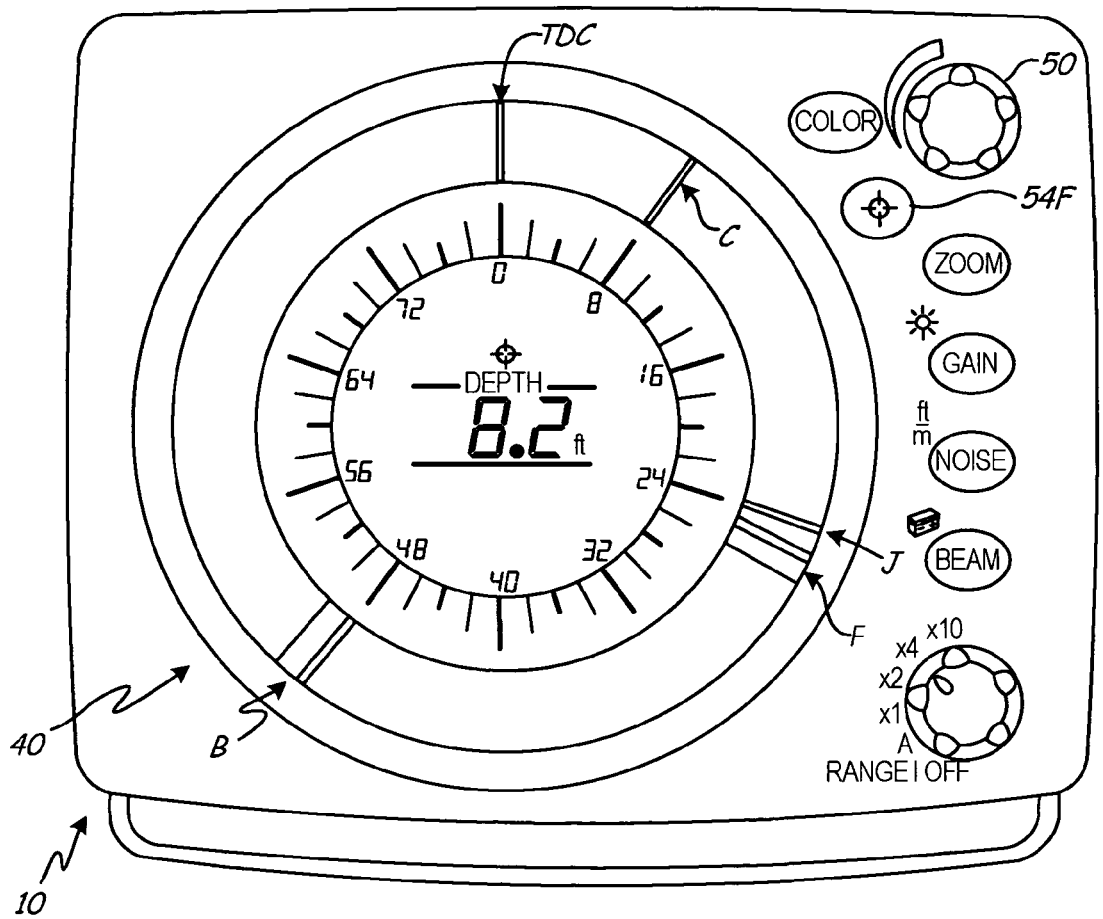

In FIG. 10B, cursor key 54F has been pressed, which causes an additional cursor mark C to appear on flasher display 40 adjacent reference mark TDC. Cursor mark C may, for example, be a white mark to distinguish it from the other marks appearing on flasher display 40. Cursor C can be moved by rotation of encoder button 50. FIG. 10C shows cursor mark C which has been moved from 0 to 8.2 feet. The depth represented by cursor C is also displayed numerically on LCD display 126.

Figure 10D:
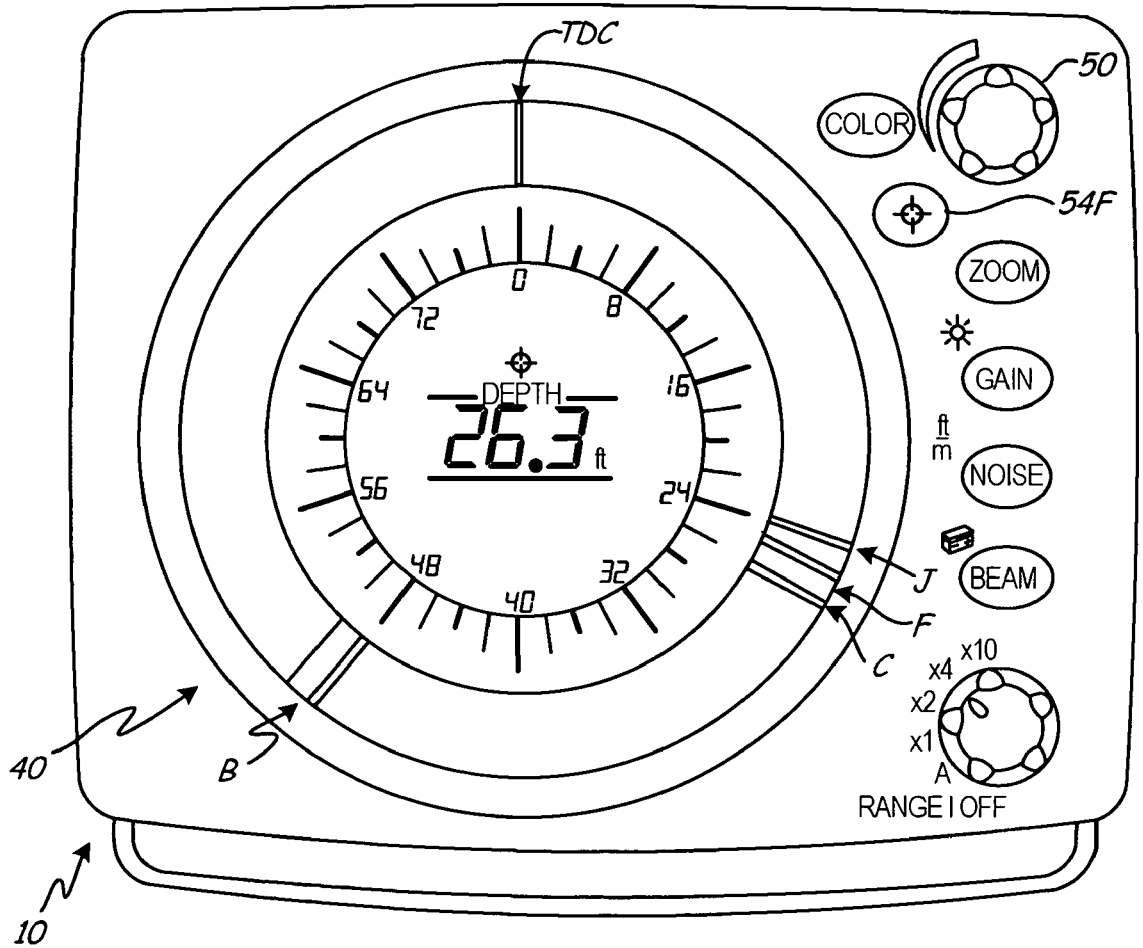

In FIG. 10D, knob 50 has been rotated to move cursor C to 26.3 feet, which is right by mark F representing the fish.

Figure 10E:
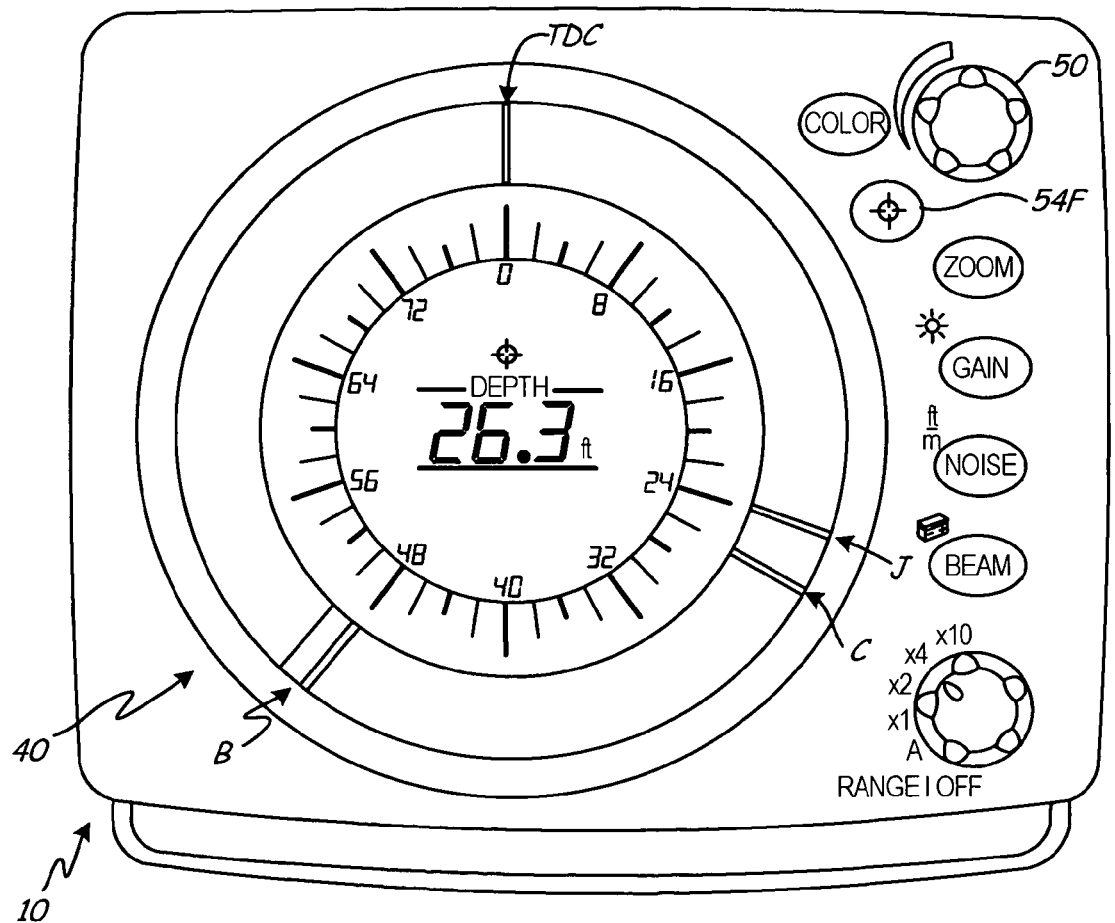

In FIG. 10E, the fish that was located at 26 feet has moved out of the water column covered by the sonar beam. As a result, jig mark J representing the jig or lure remains at 24 feet, and cursor C remains at 26.3 feet.

Figure 10F:
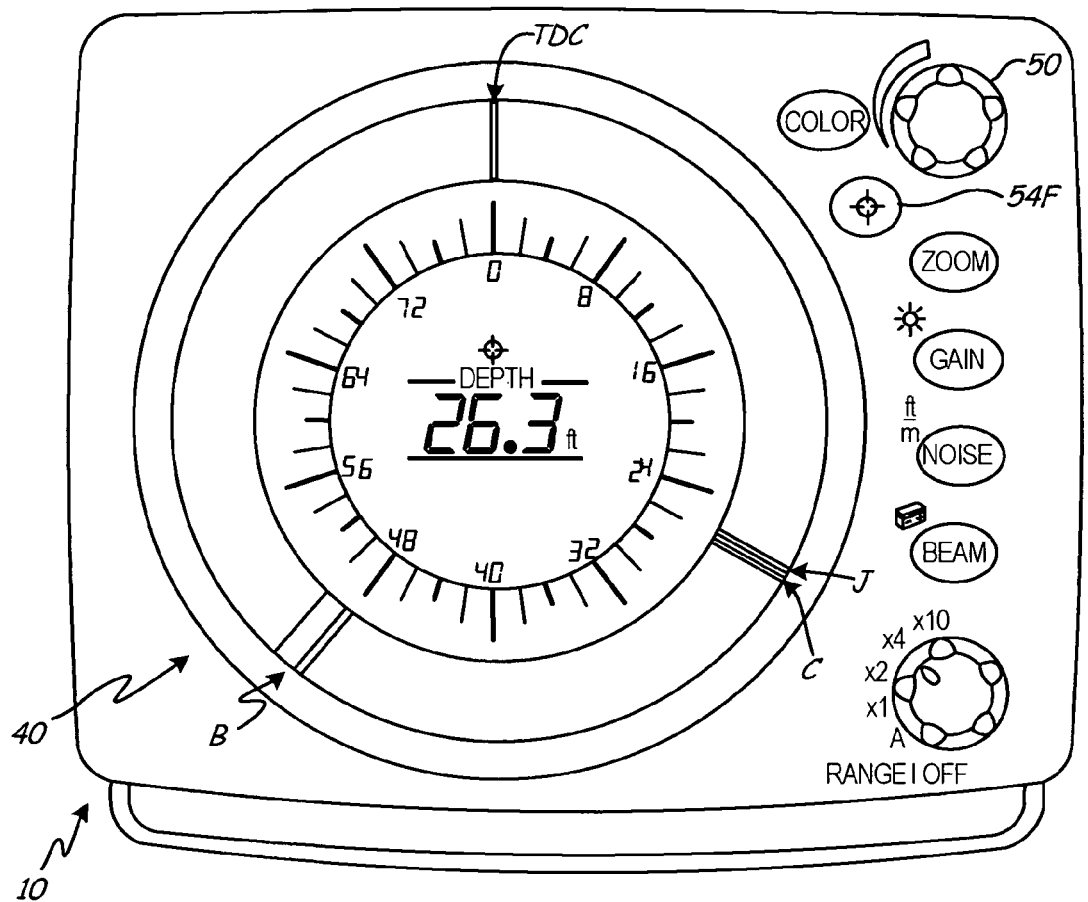
Figure 10G:
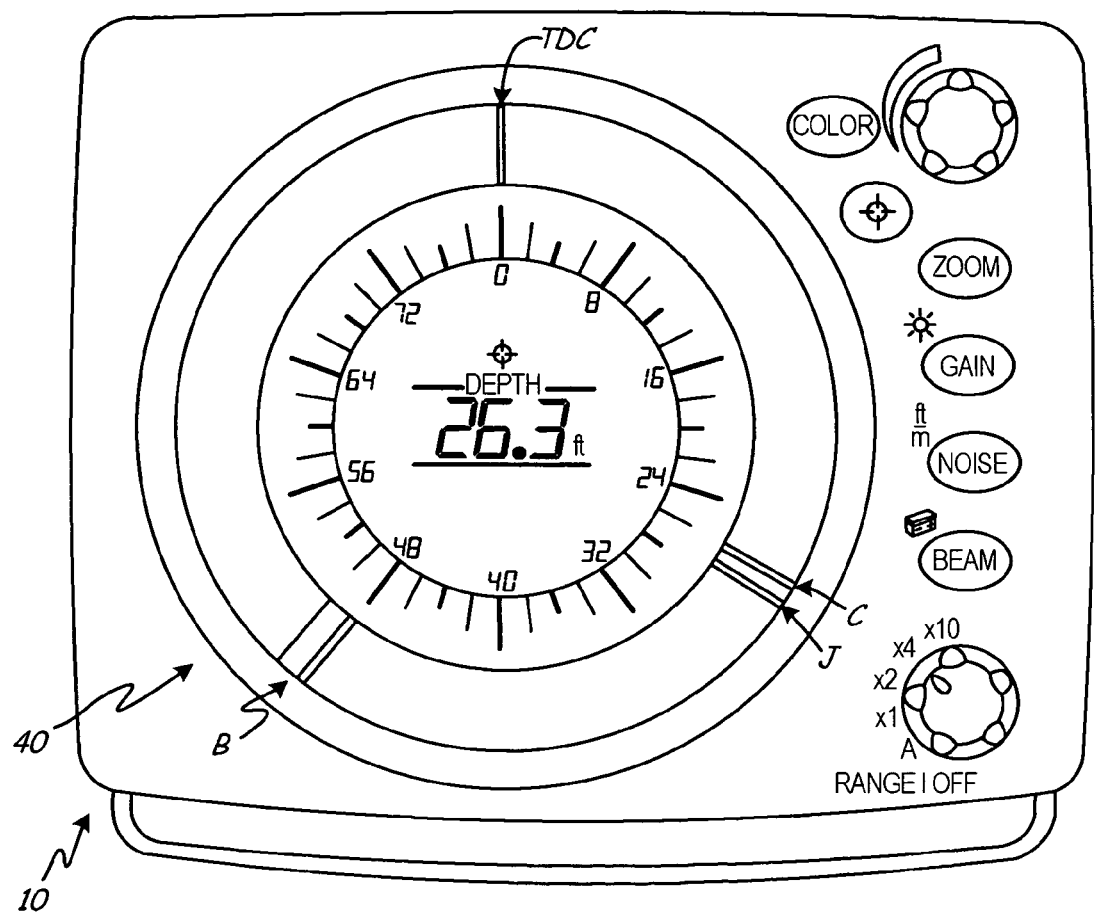

In FIG. 10F, the user has lowered the jig so that jig mark J it is slightly above cursor C, and in FIG. 10G, jig mark J is now below cursor C. This feature allows an angler to set a reference depth based upon sonar returns seen on the display, and leave that reference marker cursor in place after the fish has moved out of the sonar beam and no longer appears on the flasher display. Cursor C remains as a reference position for adjusting the location of the lure such as a jig. This is particularly advantageous in ice fishing, where the angler and sonar transducer are stationary, and fish can move in and out the sonar pulse column.

Figure 11A:
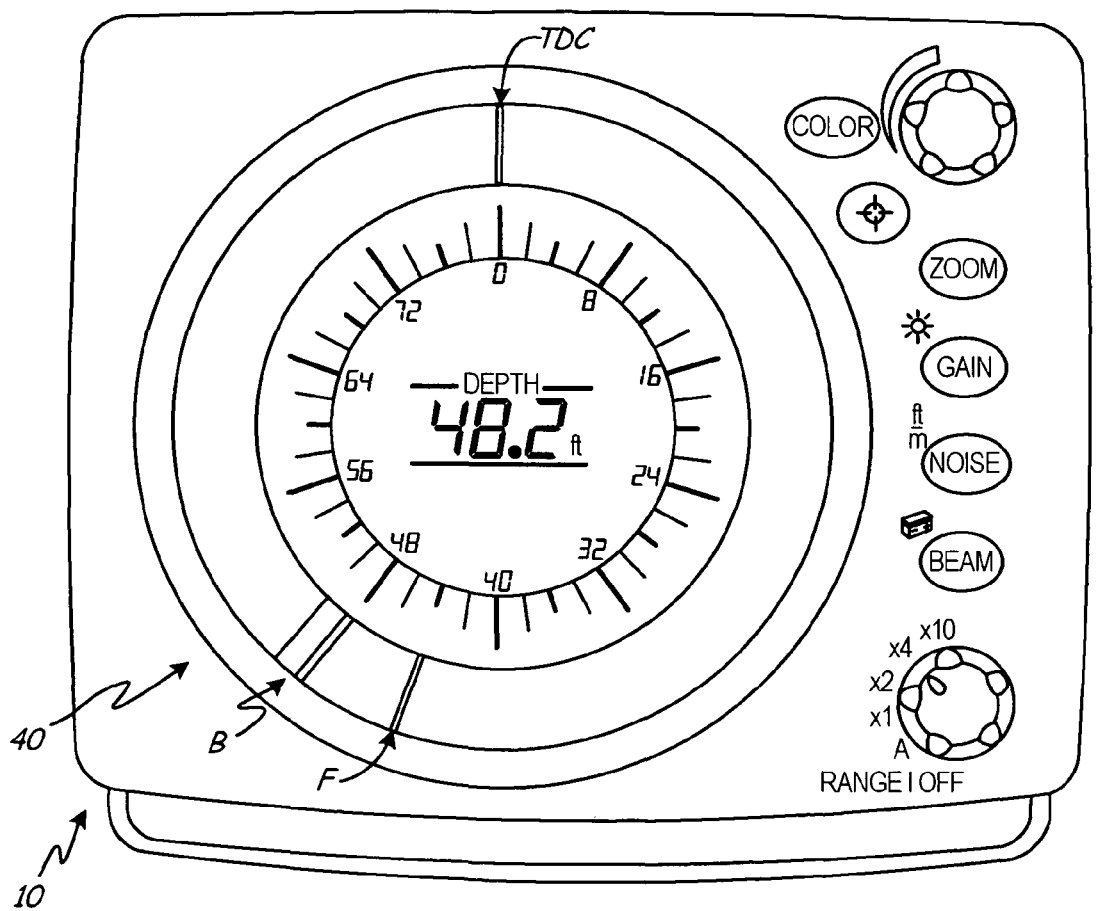
FIGS. 11A-11D are front views of the flasher sonar device illustrating the zoom feature.
Figure 11B:
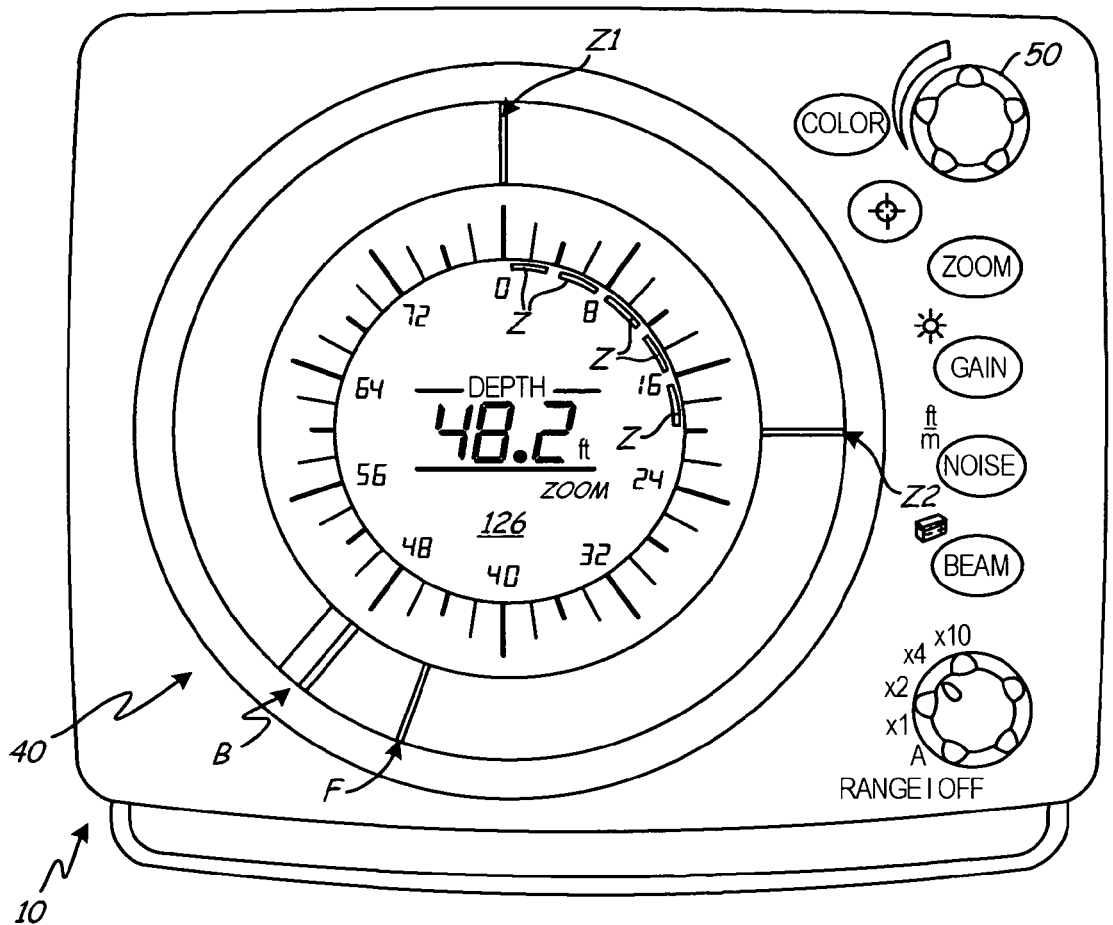

FIGS. 11A-11D illustrate the zoom feature of flasher 10. FIG. 11A shows flasher 10 before the zoom button 54A is pressed. In FIG. 11B, zoom key 54A has been pressed, which causes the word "zoom" to appear on LCD display 126. In addition, the series of five markers Z are displayed on LCD display 126 representing an arc from 0° to 90°. In the illustrated embodiment, markers Z are a series of circumferential lines. In alternative embodiments, markers Z can be any shape that clearly marks a zoom area, such as radial line cursors. Zoom cursors Z1 and Z2 are also displayed on flasher display 40 to define the 0° to 90° segment.

Figure 11C:
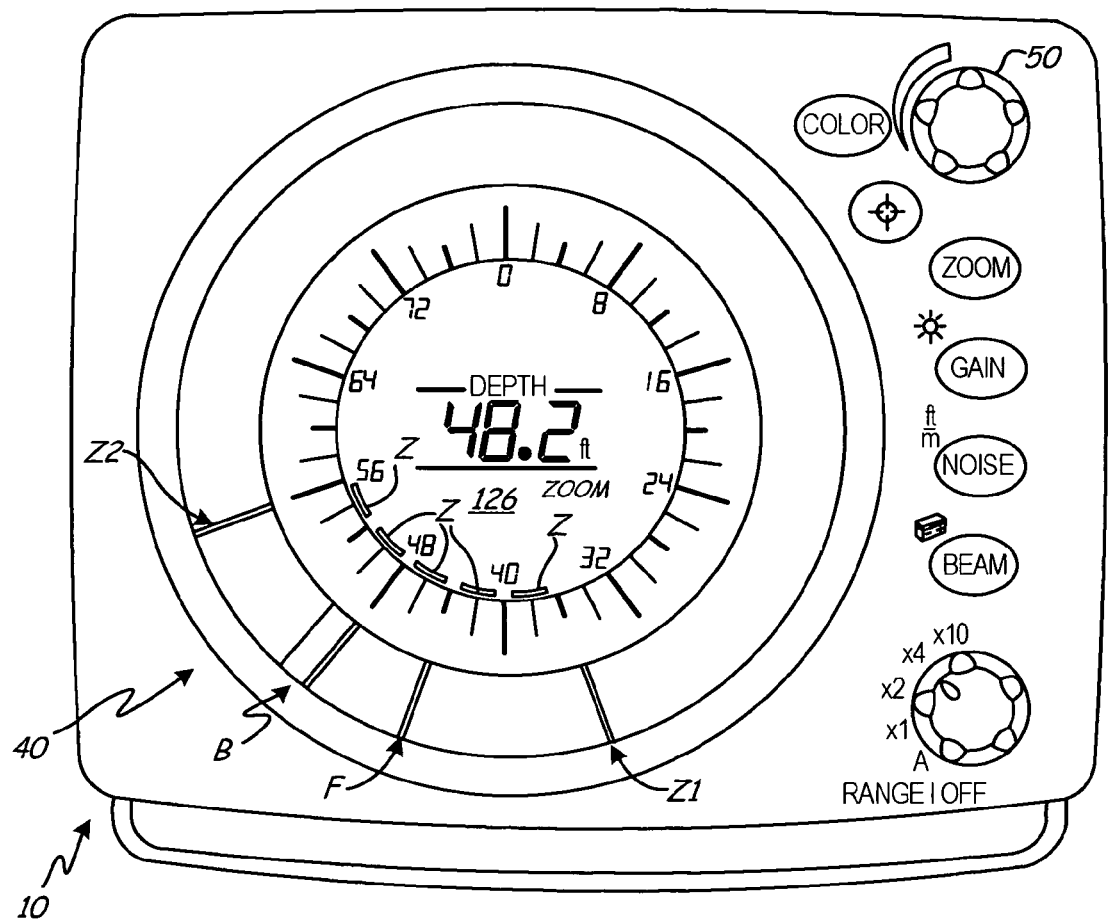
Figure 11D:
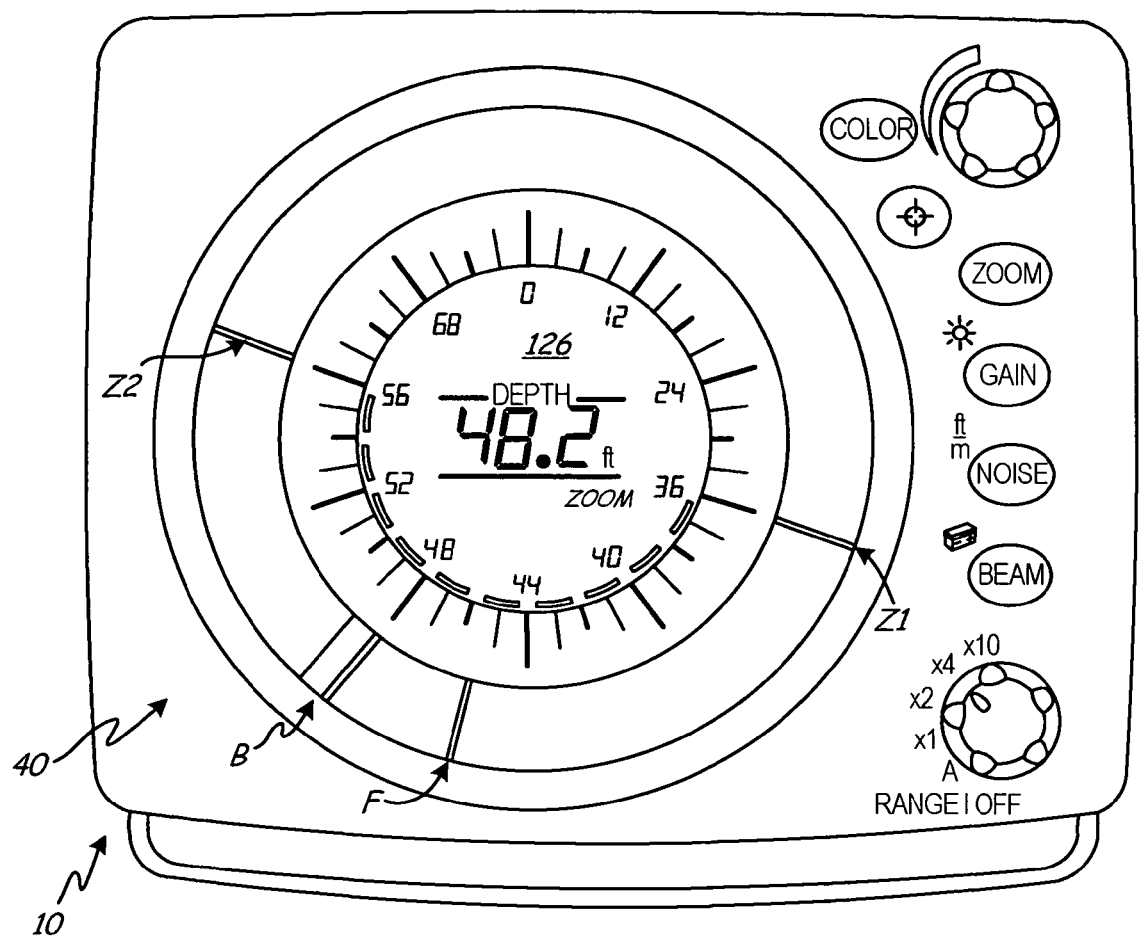
Figure 15A:
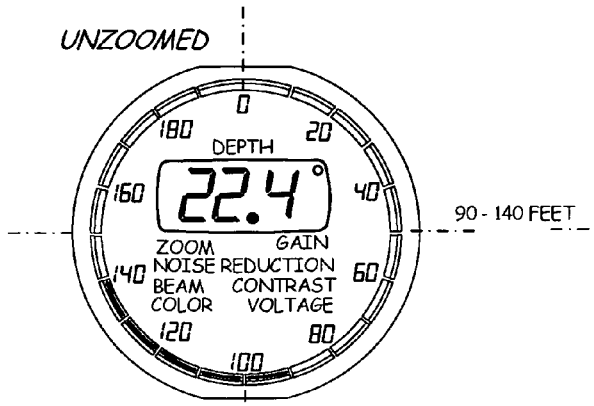
Figure 15B:
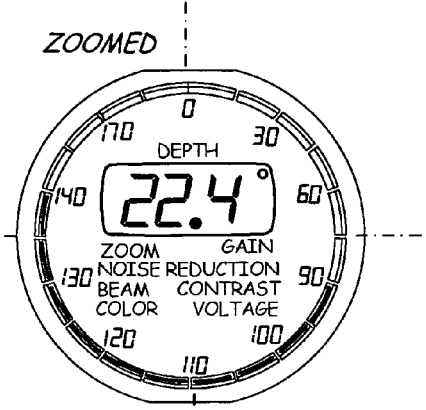
Figure 16A:
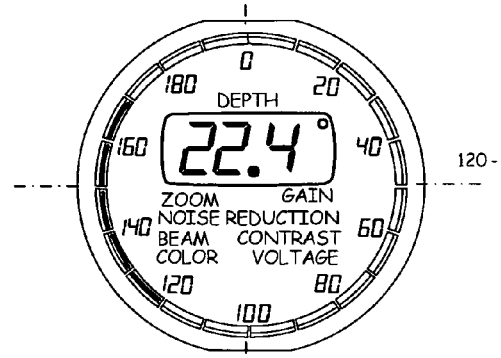
Figure 16B:
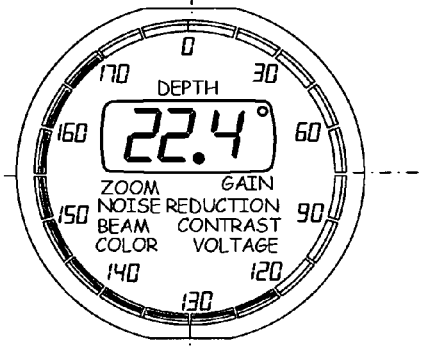
Figure 17A:
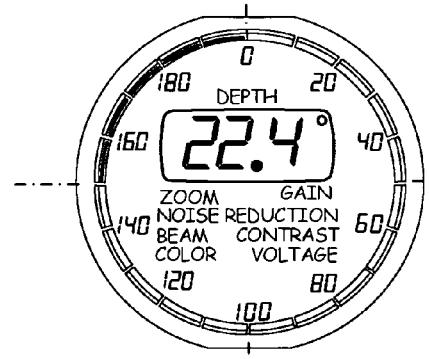
Figure 17B:
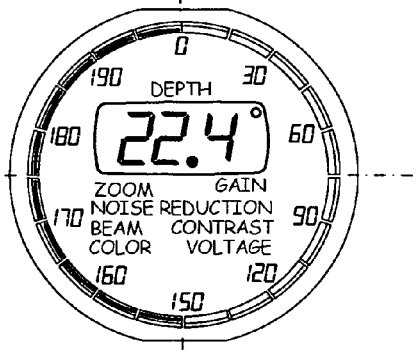

In FIG. 11C, encoder knob 50 has been rotated to advance the 90° segment defined by markers Z on LCD display 126 and cursors Z1 and Z2 on flasher display 40. In the position shown in FIG. 11C, the 90° segment extends from 162° to 252°. FIG. 11D shows the display when knob 50 is pressed to activate zoom. The 90° segment is expanded to encompass 180° rather than 90° of display 40. In the example shown in FIG. 11D, the full range has been maintained, including the zoomed region within the 360° of flasher display 40. This is in contrast with prior art zoom displays on flashers, in which the zoomed area normally is displayed on one half of the display (such as the left half) and a full range display is displayed on the opposite half. The prior art zoom displays are difficult to read and are non-intuitive. In the zoom feature of flasher 10, the ability to expand a 90° segment to 180°, and to adjust the numerical values adjacent the major graduations to reflect the zoomed and compressed segments, makes the zoomed display easier to understand and easier to use. For example, in FIG. 11C, the distance between each major gradation is annotated as 8 feet around the entire 360° of LCD display 126. In FIG. 11D, however, the zoomed region has been expanded and the remaining non-zoomed, or compressed, region has been compressed. Thus, the distance between each major gradation adjacent to the zoomed region has been reduced by 50% and is now 4 feet between each major gradation. Conversely, the distance between each major gradation adjacent to the compressed region has been increased by 50% and is now 12 feet between each major gradation.

FIGS. 12A-17A and 12B-17B illustrate another embodiment of the zoom feature. FIGS. 12A-17A show an unzoomed display on LCD display 126. In each FIG. 12A-17A, a 90° arc is identified by marker Z. The display shows a full range of 0-200 feet. In FIG. 12A, the selected 90° segment corresponds to 0-50 feet. In FIG. 13A, the segment corresponds to 30-80 feet. In FIG. 14A, the 90° segment corresponds to 60-110 feet. In FIG. 15A, the 90° segment corresponds to 90-140 feet. In FIG. 16A, the 90° segment corresponds to 120-170 feet. Finally, in FIG. 17A, the 90° segment corresponds to 150-200 feet. Thus, the 90° segment has been moved in six equal steps around the circumference of display 126 to define six potential zoom segments.

FIGS. 12B-17B show the same selected segment of FIGS. 12A-17A zoomed so that it occupies 180° rather than 90° of the circumference. In each case, the numerical values adjacent the major graduations are adjusted in the zoomed and the non-zoomed or compressed regions in FIGS. 12B-17B. For example, the major graduations in the zoomed area represent increments of 10 feet, which is 50% less than the 20 foot increments in FIGS. 12A-17A. The major graduations in the compressed or non-zoomed area represent increments of 30 feet, which is 50% more than the 20 foot increments in FIGS. 12A-17A. In other embodiments, the major graduations of the zoomed and the non-zoomed or compressed regions can be decreased and increased by any factor so long as the annotations correspond to the information displayed in the zoomed and the non-zoomed or compressed regions substantially accurately.

Figure 18A:
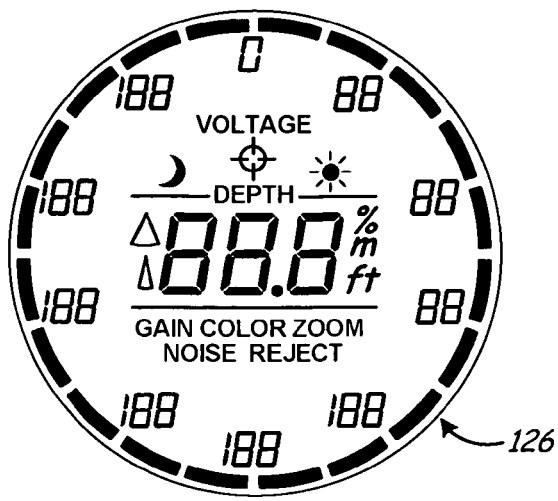
FIG. 18A shows the LCD display with all elements of the numerical displays, words, symbols, and icons activated.
Figure 18B:
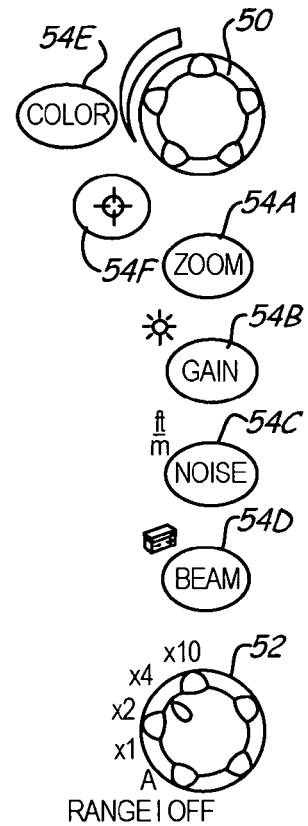
FIG. 18B shows a diagram of the keypad, encoder, and selector switch inputs.

FIG. 18A shows a view of LCD display 126 with all segments and icons activated. FIG. 18B shows input keys 54A-54F, as well as knobs 50 and 52. Various features of flasher 10 are selectable through the use of keys 54A-54F and encoder knob 50. In certain respects, segments and icons activated in FIG. 18A differ from segments and icons activated in other figures, such as FIGS. 12A-17B. These differences illustrate just some of the embodiments of LCD display 126 that are possible. In other embodiments, segments and icons can be arranged in virtually any manner consistent with the invention disclosed, herein.

Zoom key 54A is used to select a zoom mode, and encoder 50 is used to select the segment of the normal flasher display that will be expanded in a zoom display. To switch from a normal to a zoom display after the zoom mode has been selected, the user first selects the segment to be zoomed by rotating encoder knob 50, and then switches to the zoom display by pressing encoder button 50. To return to a normal display, the user presses encoder button 50 again. To exit the zoom mode, zoom button 54A is pressed.

Gain key 54B is used to select a gain setting. The gain setting is used by microprocessor 102 to set a threshold for return signals that will result in a flasher display line or pixel and the color of that line. The selection of a gain setting is provided by rotating encoder knob 50. When the desired setting has been reached, it is entered by pressing encoder knob 50. The gain setting is displayed on liquid crystal display 126 when the gain selection function has been selected by pressing gain key 54B.

The gain key 54B is also used to control whether backlighting will be provided to liquid crystal display 126. The user can select backlighting by pressing and holding gain key 54B until backlighting comes on. Similarly, backlighting can be turned off by again pressing and holding gain key 54B.

Noise key 54C is used to select noise settings. Pressing noise key 54C causes the noise setting causes the noise settings to be displayed on liquid crystal display 126. That noise setting then can be selected using encoder knob 50. Selection of noise settings can be as simple as the selection between no noise filtering and filtering, or can involve multiple levels of noise rejection or filtering.

Noise key 56C provides a different feature when it is pressed and held. In that case, a selection between feet and meters as the units of measurement can be made. The current depth using the current unit of measurement is displayed, and the user can change units by pressing encoder knob 50.

Beam key 54D allows the user to select either a wide beam or a narrow beam. Pressing beam key 54 toggles the narrow and wide beam selection. An icon appears on LCD display 126 indicating whether the current setting is a wide beam or a narrow beam.

Beam key 54D can be used to obtain an indication of battery life remaining. The battery check feature is accessed by pressing and holding beam key 54D. A battery life percentage appears on LCD display 126 to indicate battery life.

Color key 54E allows the user to select one of three different color modes. Currently available flasher units typically use three colors: red, green, and amber, to represent the strength of the sonar return signals. Typically red represents the strongest sonar return signal and either green or amber represents the lowest sonar return signal that is displayed. When key 54E is pressed, the user is given the opportunity to select one of three color modes. Two of the modes are three color modes, which differ from one another on whether green or amber is the weakest signal. The third mode is a six color mode, which provides much greater range of displayable information. In any of the three modes, a white line can also be generated, which is used for the active cursor feature described in conjunction with FIGS. 10A-10G.

The color mode selection is done using color key 54E to scroll between color modes 1, 2, and 3. The current selected color mode is displayed on LCD display 126 while the color selection mode is in process.

Cursor key 54F is used to select an active cursor mode, which is illustrated in FIGS. 10A-10G.

FIG. 19A-19J show the center portion of display 126. Different functions are selected using keys 54A-54F and knobs 50 and 52.

FIG. 19A shows the display when zoom feature is active. The word "zoom" appears below the numerical depth. When the zoom feature is off, the word "zoom" does not appear.

FIG. 19B shows the display when cursor key 54F has been pressed. The cursor symbol appears immediately above the word "depth". The same cursor symbol appears on cursor key 54F. When the cursor symbol is present, the numerical depth value displayed is the cursor depth, rather than the bottom depth.

FIG. 19C shows a gain setting of "14" and the word "gain". FIG. 19C shows settings of "1" to "20" are indicated as available. In another embodiment, smaller or larger numbers of gain settings can be used. For example, in one embodiment, gain settings can vary from "1" to "45".

FIG. 19D illustrates the noise reject setting display. A numerical value (in this case 3) appears above the words "noise reject". The settings may range 1 to 5 as illustrated in FIG. 19D, or to larger or smaller numbers.

FIG. 19E shows the color mode select when color key 54E is pressed. Three possible modes are selectable, as described earlier. The mode selected is identified above the word "color".

In FIG. 19F, the status of battery 200 is displayed. This display is accessed by pressing and holding beam key 54D. The numerical percentage displayed is generated by microprocessor 210 based upon a signal from battery monitor 222.

FIG. 19G shows a beam select display that is produced when beam key 54D is pressed. Either a wide or narrow beam can be selected. A narrow beam icon appears in FIG. 19G, while a wide beam icon appears in FIGS. 19H, 19I, and 19J.

FIG. 19H shows the back light on/off display. When back lighting is on, the back light icon is displayed above the depth value.

FIG. 19I illustrates a night mode which can be turned on or off. The night mode is designated by the moon icon that appears above the depth value.

FIG. 19J illustrates display of depth in meters rather than feet. Selection of units is made by depressing and holding noise key 54C.

The flasher sonar device of the invention includes a number of new features that improve functionality and ease of use for the user. First, the sonar device includes an LCD display positioned with respect to the flasher ring to provide dynamic annotated range scales. Depending upon the particular range selected by the user, or selected automatically by the sonar device, the LCD display provides numerical depth values adjacent graduation marks on a scale. As the range changes, the numerical values provided on the LCD display change, so that the numerical values adjacent the graduation marks are always consistent with the operating range currently being used by the sonar device.

Second, the LCD display can also provide other useful information to the user. The displayed information can include digital depth, visual feedback for settings such as sensitivity and noise, and icons to allow the user to quickly determine the current settings and change settings or operating modes of the sonar device unit.

Third, the sonar device offers improved functionality such as a zoom feature with dynamic annotated range scales, which makes it easier for the user to accurately determine the depth of the target being observed.

Fourth, the flasher sonar device includes an automatic depth range feature, in which the sonar device automatically selects an operating range based upon the detected depth at the bottom. As a result, the depth range is adjusted so that as much as possible of the entire 360° of the flasher display ring is used to display sonar returns.

Fifth, another feature of the flasher sonar device is a cursor that appears in the flasher ring and is movable by the user using a control input such as a control knob. The cursor allows the user to pinpoint a depth of a particular target. The cursor can then be used as a guide for positioning a lure at an appropriate depth.

Sixth, with the use of dynamic annotated range scales, the LCD display provides a simple and easy-to-use selection between units of measurement. Either feet or meters can be selected by the user, and the numeric depth values displayed on the LCD display for the selected range reflect a selected unit of measurement. As a result, the user does not have to mentally convert units on the scale, as has been typical with prior art flashers.

Although the present invention has been described with reference to preferred embodiments, workers skilled in the art will recognize that changes may be made in form and detail without departing from the spirit and scope of the invention.

What is claimed is:

1. A flasher sonar device comprising:
   a motor driven flasher that produces light output pulses at angular positions along a flasher ring lens based upon sonar returns;
   a liquid crystal display (LCD) positioned concentrically with the flasher ring lens for displaying a dynamic annotated range scale associated with the flasher ring lens; and
   a controller for coordinating operation of the motor driven flasher and the LCD.

2. The flasher sonar device as set forth in claim 1, wherein the dynamic annotated range scale comprises a plurality of numerical depth values, each adjacent to one of a plurality of scale graduations.

3. The flasher sonar device as set forth in claim 2, further comprising a ring overlay to define the plurality of scale graduations, wherein the ring overlay is positioned concentrically between the LCD and the flasher ring lens.

4. The flasher sonar device as set forth in claim 2, wherein the dynamic annotated range scale changes the plurality of numerical depth values based upon a range scale change in response to one of the following:
 a user input changing a fixed range setting;
 a user input changing a unit of linear measurement;
 a user input activating a zoom mode; or
 a controller activating an automatic range change.

5. The flasher sonar device as set forth in claim 1, wherein the controller controls operation of the LCD through an LCD interface to display different information on the LCD based upon an input from a user interface.

6. The flasher sonar device as set forth in claim 1, wherein the controller automatically selects a desired range from a plurality of possible ranges, wherein the desired range is a smallest possible range that will display a bottom, a surface, and a space in between.

7. The flasher sonar device as set forth in claim 1, wherein the controller controls the motor driven flasher to show a cursor mark to appear on the flasher ring lens, the flasher sonar device further comprising:
 a user interface coupled to the controller to allow the user to move the cursor mark to a desired location on the flasher ring lens.

8. The flasher sonar device as set forth in claim 7, wherein the controller causes the LCD to display a numerical cursor depth, the numerical cursor depth being a depth associated with a location of the cursor mark on the flasher ring lens.

9. The flasher sonar device as set forth in claim 1, wherein the controller selects a range and controls the LCD to display the dynamic annotated range scale based on the range selected.

10. The flasher sonar device as set forth in claim 1, wherein the controller selects a normal range and a zoom range, the zoom range being smaller than the normal range, and the controller drives the motor driven flasher to display both the normal range and the zoom range wherein the zoom range is displayed in a larger scale than the normal range.

11. The flasher sonar device as set forth in claim 10, wherein the controller automatically changes the dynamic annotated range scale to correspond substantially accurately to both the normal range and the zoom range.

12. A flasher sonar device comprising:
 an annular window;
 a light source rotated by a motor and aligned so as to emit light out the annular window;
 a liquid crystal display (LCD) aligned adjacent the annular window and displaying a dynamic annotated range scale on its perimeter;
 a sonar circuit connected to and controlling the light source and the LCD; and
 a controller for controlling the light source and the LCD so as to convey to a user depth of a one or more targets in the water.

13. The flasher sonar device as set forth in claim 12, wherein the controller controls the light source to show a cursor mark to appear on the annular window, the flasher sonar device further comprising:
 a user interface coupled to the controller to allow the user to move the cursor mark to a desired location on the flasher ring lens.

14. The flasher sonar device as set forth in claim 13, wherein the controller causes the LCD to display a numerical cursor depth, the numerical cursor depth being a depth associated with a location of the cursor mark on the annular window.

15. The flasher sonar device as set forth in claim 12, wherein the controller selects a normal range and a zoom range, the zoom range being smaller than the normal range, and the controller drives the light source and the LCD to display both the normal range and the zoom range, wherein the zoom range is displayed in a larger scale than the normal range, and wherein the controller automatically changes the dynamic annotated range scale to correspond substantially accurately to both the normal range and the zoom range.

16. A flasher sonar device comprising:
 a rotating flasher for obtaining depth information and outputting a corresponding one or more flashes through a flasher ring lens, a depth of a one or more targets in the water displayed as the one or more flashes; and
 a display aligned concentrically inside the flasher ring lens for displaying a dynamic annotated range scale.

17. The flasher sonar device as set forth in claim 16, further comprising:
 a user interface for selecting a unit of linear measurement; and
 a controller for controlling the display to change the dynamic annotated range scale according to the unit of linear measurement currently selected.

18. The flasher sonar device as set forth in claim 16, wherein the dynamic annotated range scale comprises a plurality of numerical depth values, each adjacent to one of a plurality of scale graduations.

19. A method for displaying depth results comprising:
 rotating a flasher about an axis so as to produce light output pulses through an annular window at angular positions along a circular ring based upon sonar returns; and
 displaying a dynamic annotated range scale on a liquid crystal display (LCD) located concentrically with and substantially adjacent to the annular window.

20. The method as set forth in claim 19, comprising further steps of:
 selecting a range based upon a range selection input received from a user interface; and
 displaying the dynamic annotated range scale based upon the range selected.

* * * * *